US012812717B2

(12) United States Patent
Manolakos et al.

(10) Patent No.: US 12,812,717 B2
(45) Date of Patent: Nov. 24, 2026

(54) RADIO RESOURCE CONTROL (RRC) INACTIVE AND RRC IDLE MODE POSITIONING CONFIGURATION

(71) Applicant: QUALCOMM Incorporated, San Diego, CA (US)

(72) Inventors: Alexandros Manolakos, Escondido, CA (US); Sony Akkarakaran, Poway, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 729 days.

(21) Appl. No.: 17/481,642

(22) Filed: Sep. 22, 2021

(65) Prior Publication Data

US 2022/0225462 A1 Jul. 14, 2022

Related U.S. Application Data

(60) Provisional application No. 63/137,490, filed on Jan. 14, 2021.

(51) Int. Cl.
*H04W 76/20* (2018.01)
*G01S 5/00* (2006.01)
(Continued)

(52) U.S. Cl.
CPC ........... *H04W 76/20* (2018.02); *G01S 5/0036* (2013.01); *H04L 5/0051* (2013.01); *H04W 24/10* (2013.01)

(58) Field of Classification Search
CPC ..... H04W 76/20; H04W 24/10; H04W 24/08; H04W 64/00; H04W 76/27; H04W 76/28;
(Continued)

(56) References Cited

U.S. PATENT DOCUMENTS

2018/0220392 A1* 8/2018 Ly .......................... H04L 5/005
2019/0239031 A1* 8/2019 Li .......................... H04W 4/029
(Continued)

FOREIGN PATENT DOCUMENTS

WO WO-2019162513 A1 * 8/2019 ............ H04W 24/10
WO WO-2020018903 A1 * 1/2020 ............ G01S 1/042
(Continued)

OTHER PUBLICATIONS

International Search Report and Written Opinion - PCT/US2021/072584—ISA/EPO—Apr. 4, 2022.
(Continued)

*Primary Examiner* — Ian N Moore
*Assistant Examiner* — Latresa A McCallum
(74) *Attorney, Agent, or Firm* — QUALCOMM Incorporated

(57) ABSTRACT

Disclosed are techniques for wireless communication. In an aspect, a user equipment (UE) may transmit, to a network entity comprising a location server and/or base station, a positioning capability report that includes a set of positioning capability parameters for a radio resource control (RRC) connected state. The UE may enter an RRC unconnected state, the RRC unconnected state comprising an RRC inactive state or an RRC idle state. The UE may perform positioning reference signal (PRS) processing during the RRC unconnected state according to one or more positioning capability parameters from the set of positioning capability parameters for the RRC connected state.

32 Claims, 15 Drawing Sheets

(51) Int. Cl.
*H04L 5/00* (2006.01)
*H04W 24/10* (2009.01)

(58) Field of Classification Search
CPC ...... H04W 8/24; G02S 5/0036; H04L 5/0051; H04L 5/0048; G01S 5/0018; G01S 5/0045
See application file for complete search history.

(56) References Cited

U.S. PATENT DOCUMENTS

| | | | | |
|---|---|---|---|---|
| 2020/0028648 | A1* | 1/2020 | Akkarakaran | G01S 1/042 |
| 2020/0236644 | A1 | 7/2020 | Gunnarsson et al. | |
| 2020/0329523 | A1* | 10/2020 | Yi | H04W 72/51 |
| 2022/0225145 | A1* | 7/2022 | Wu | H04L 5/0094 |
| 2023/0037478 | A1* | 2/2023 | Huang | G01S 5/009 |
| 2023/0262648 | A1* | 8/2023 | Thomas | H04W 64/00 455/456.1 |
| 2023/0336309 | A1* | 10/2023 | Zhuang | G01S 5/00 |
| 2023/0379860 | A1* | 11/2023 | Rao | G01S 5/01 |
| 2024/0163836 | A1* | 5/2024 | Khoryaev | H04L 5/0051 |
| 2024/0224219 | A1* | 7/2024 | Lee | H04W 64/00 |
| 2024/0340839 | A1* | 10/2024 | Ghimire | H04L 5/0048 |
| 2025/0220628 | A1* | 7/2025 | Khoshkholgh Dashtaki | H04W 64/00 |

FOREIGN PATENT DOCUMENTS

| | | | | |
|---|---|---|---|---|
| WO | 2020146739 | A1 | 7/2020 | |
| WO | WO-2021204293 | A1 * | 10/2021 | G01S 5/009 |

OTHER PUBLICATIONS

Catt: "Discussion of NR Positioning Enhancements", 3GPP TSG RAN WG1 Meeting #102, R1-2005712, e-Meeting, Aug. 17-28, 2020, Aug. 28, 2020, pp. 1-21.

Huawei., et al., "[Post112-e][609][POS] Positioning Support in RRC_IDLE and RRC_INACTIVE (Huawei)", 3GPP TSG-RAN WG2 Meeting #113-e, R2-201, Electronic, Jan. 25- Feb. 5, 2021, pp. 1-35.

Qualcomm Incorporated: "On Demand Transmission of PRS for NR", 3GPP TSG-RAN WG2 Meeting #105, R2-1901373, 3rd Generation Partnership Project (3GPP), Mobile Competence Centre, 650, Route Des Lucioles, F-06921 Sophia-Antipolis Cedex, France, vol. Ran WG2, No. Athens, Greece, Feb. 25, 2019-Mar. 1, 2019, Feb. 15, 2019, XP051602732, pp. 1-15.

* cited by examiner

RADIO RESOURCE CONTROL (RRC) INACTIVE AND RRC IDLE MODE POSITIONING CONFIGURATION

CROSS-REFERENCE TO RELATED APPLICATION

This application claims priority to U.S. Provisional Patent Application No. 63/137,490 filed Jan. 14, 2021, entitled "RADIO RESOURCE CONTROL (RRC) INACTIVE MODE POSITIONING CONFIGURATION," which is assigned to the assignee hereof and is expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes determining a first set of positioning capability parameters for a radio resource control (RRC) connected state; determining a second set of positioning capability parameters for an RRC unconnected state, wherein the RRC unconnected state comprises an RRC inactive state or an RRC idle state; transmitting, to a network entity, a positioning capability report that comprises the first set of positioning capability parameters; and performing positioning reference signal (PRS) processing at least according to one or more positioning capability parameters from the set of positioning capability parameters for the RRC state of the UE, the RRC state of the UE comprising the RRC connected state or the RRC unconnected state.

In an aspect, a method of wireless communication performed by a network entity includes receiving, from a UE, a positioning capability report that comprises a first set of positioning capability parameters for a RRC connected state; determining a second set of positioning capability parameters for an RRC unconnected state, wherein the RRC unconnected state comprises an RRC inactive state or an RRC idle state; determining, based on the first set of positioning capability parameters and the second set of positioning capability parameters, a PRS configuration for the UE; and transmitting, to the UE, positioning assistance data that comprises the PRS configuration for the UE.

In an aspect, a UE includes a memory; at least one transceiver; and at least one processor communicatively coupled to the memory and the at least one transceiver, the at least one processor configured to: determine a first set of positioning capability parameters for a RRC connected state; determine a second set of positioning capability parameters for an RRC unconnected state, wherein the RRC unconnected state comprises an RRC inactive state or an RRC idle state; transmit, via the at least one transceiver, a positioning capability report to a network entity, the positioning capability report comprising the first set of positioning capability parameters; and perform PRS processing at least according to one or more positioning capability parameters from the set of positioning capability parameters for the RRC state of the UE, the RRC state of the UE comprising the RRC connected state or the RRC unconnected state.

In an aspect, a UE includes means for determining a first set of positioning capability parameters for a RRC connected state; means for determining a second set of positioning capability parameters for an RRC unconnected state, wherein the RRC unconnected state comprises an RRC inactive state or an RRC idle state; means for transmitting, to a network entity, a positioning capability report that comprises the first set of positioning capability parameters; and means for performing PRS processing at least according to one or more positioning capability parameters from the set of positioning capability parameters for the RRC state of the UE, the RRC state of the UE comprising the RRC connected state or the RRC unconnected state.

In an aspect, a non-transitory computer-readable medium storing computer-executable instructions that, when executed by a UE, cause the UE to: determine a first set of positioning capability parameters for a RRC connected state; determine a second set of positioning capability parameters for an RRC unconnected state, wherein the RRC unconnected state comprises an RRC inactive state or an RRC idle state; transmit, to a network entity, a positioning capability report that comprises the first set of positioning capability parameters; and perform PRS processing at least according to one or more positioning capability parameters from the set of positioning capability parameters for the RRC state of the UE, the RRC state of the UE comprising the RRC connected state or the RRC unconnected state.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
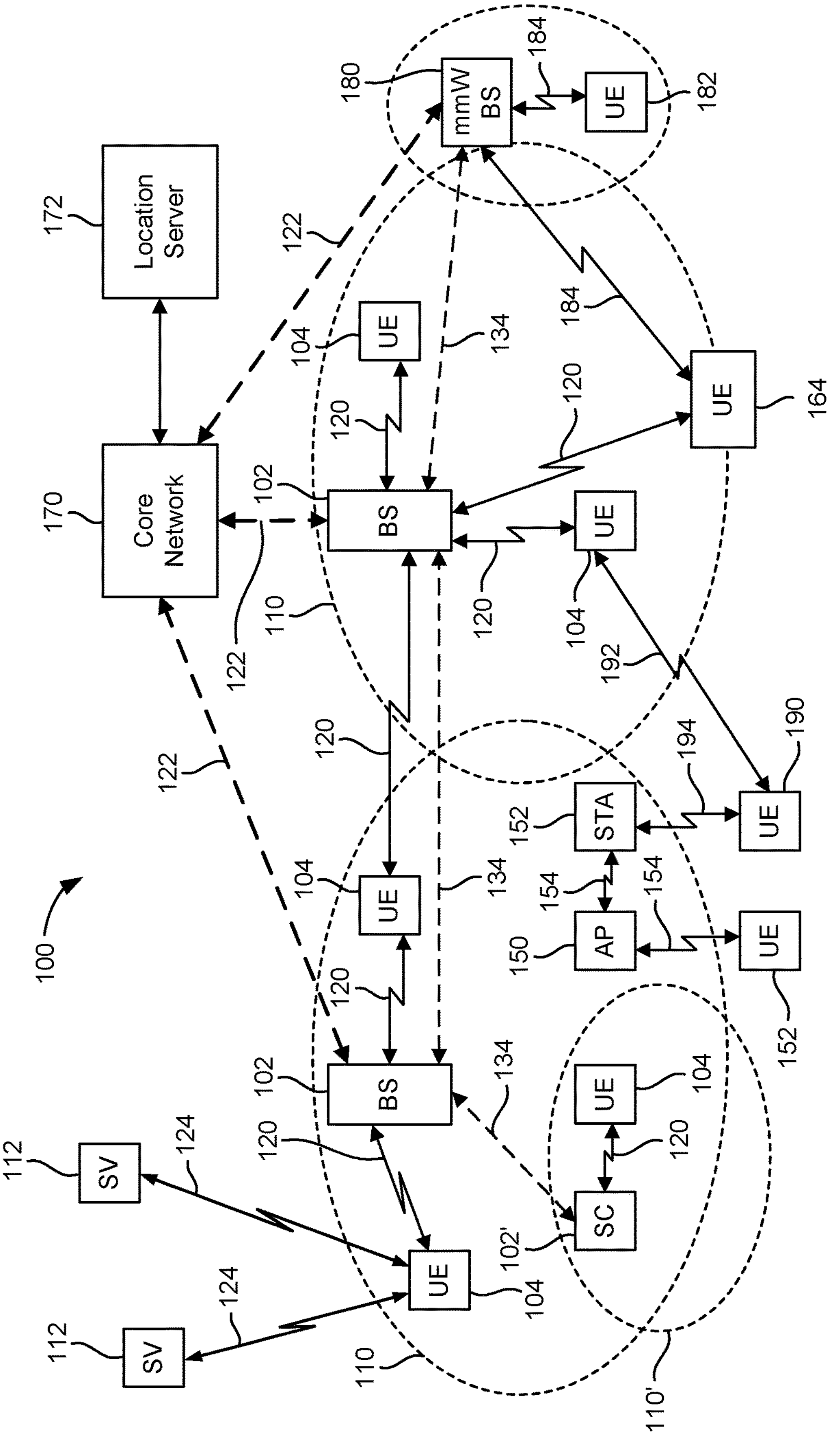
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen-before-talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
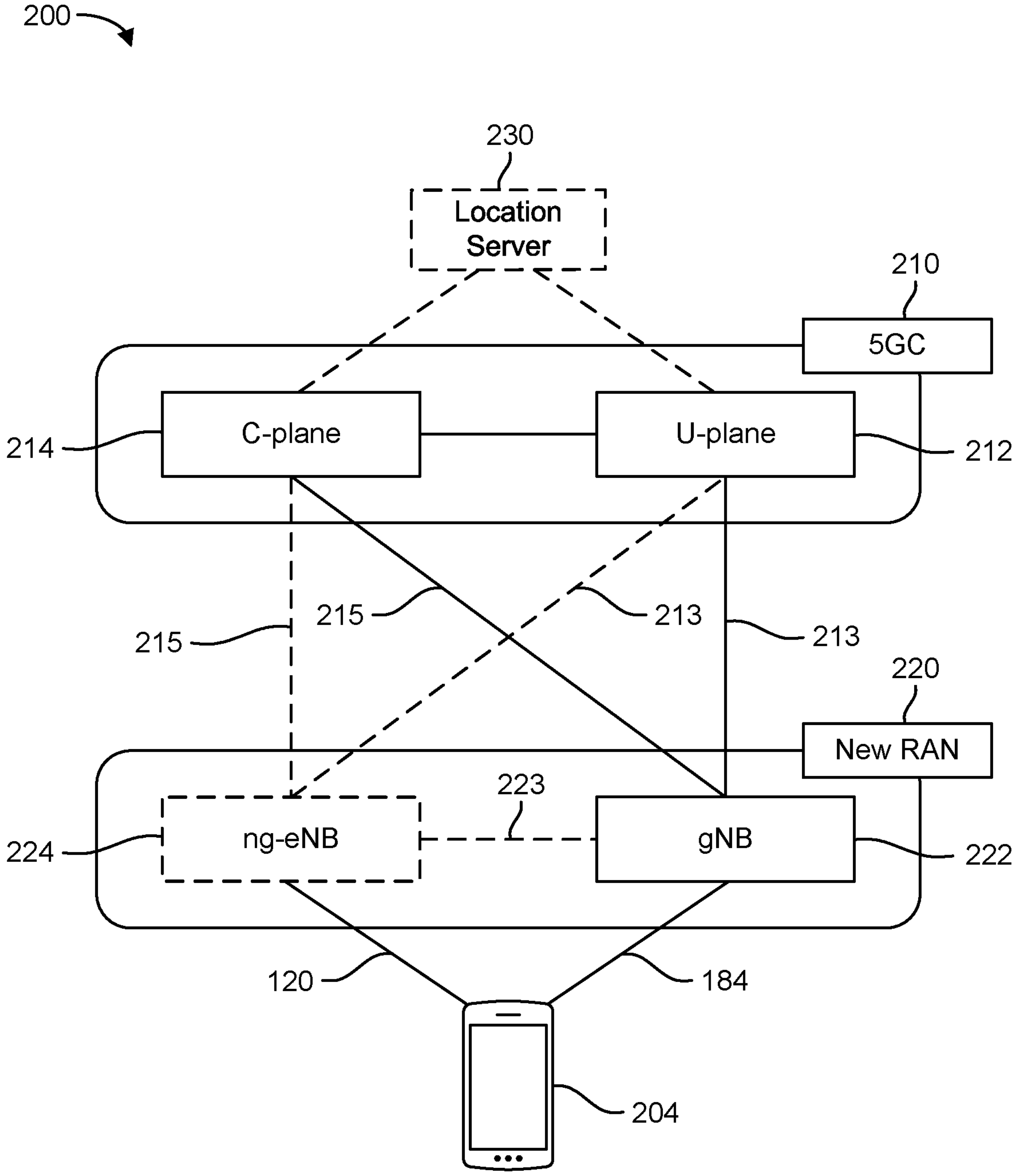
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
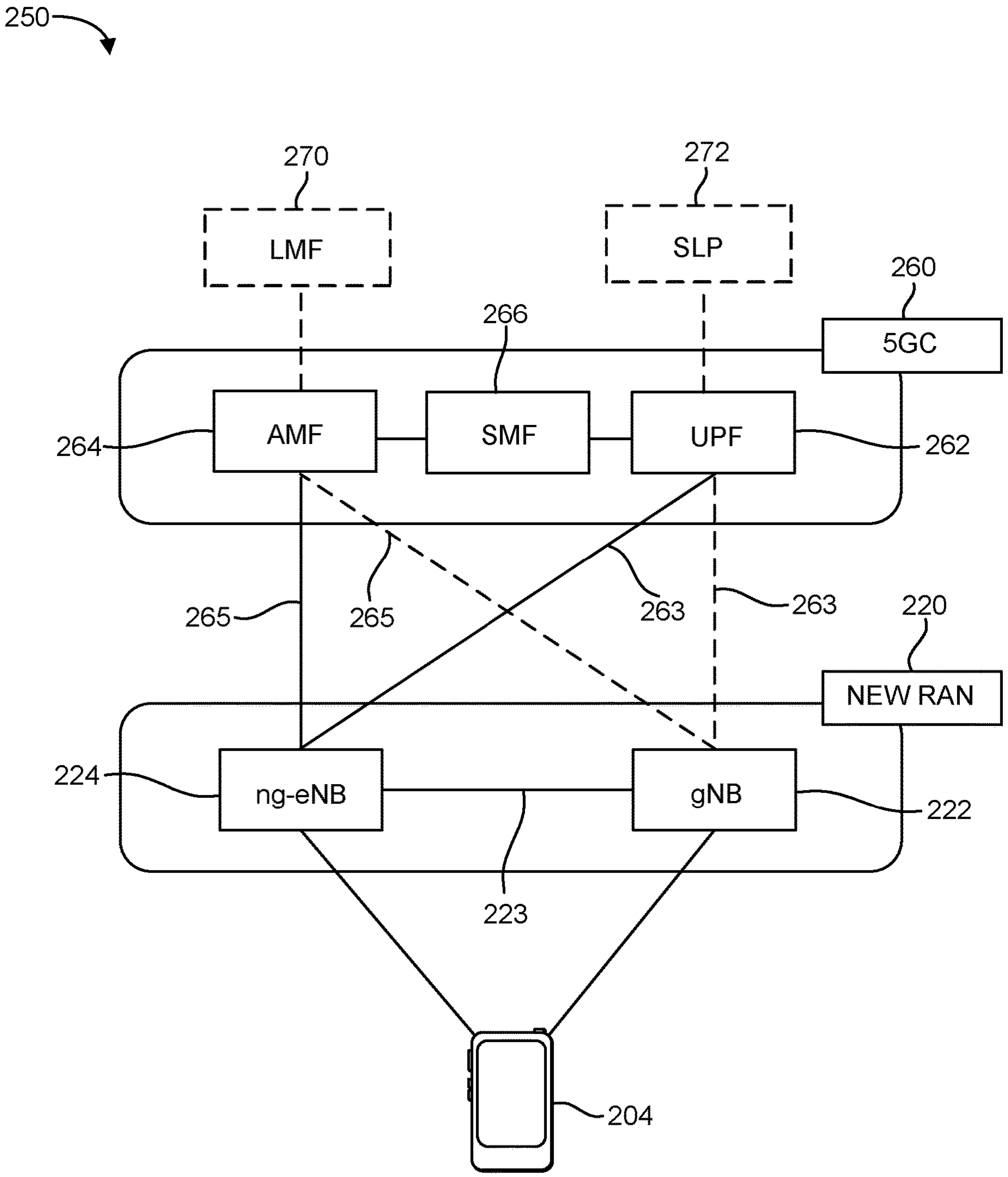

FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
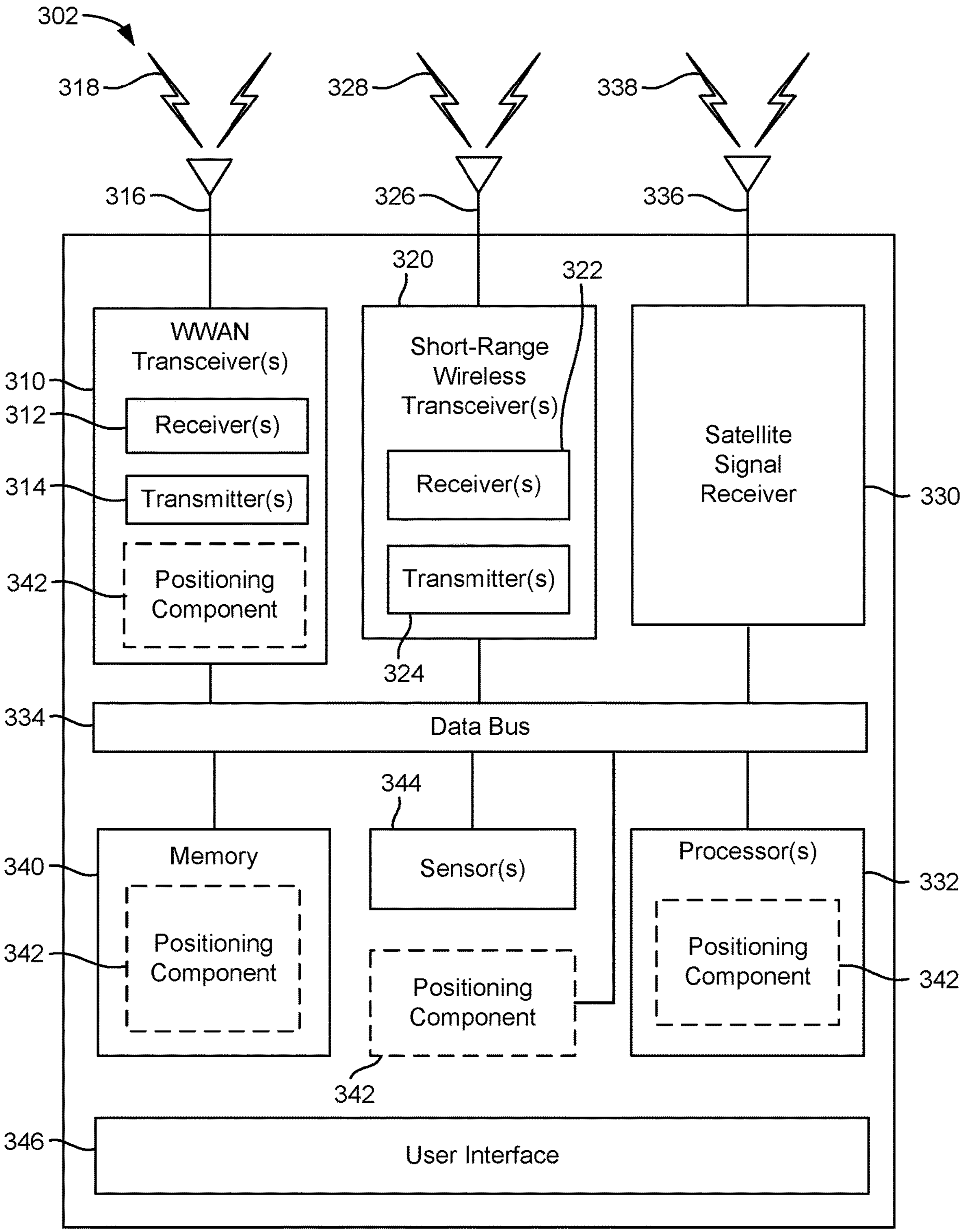
FIGS. 3A, 3B, and 3C are simplified block diagrams of several sample aspects of components that may be employed in a user equipment (UE), a base station, and a network entity, respectively, and configured to support communications as taught herein.
Figure 3B:
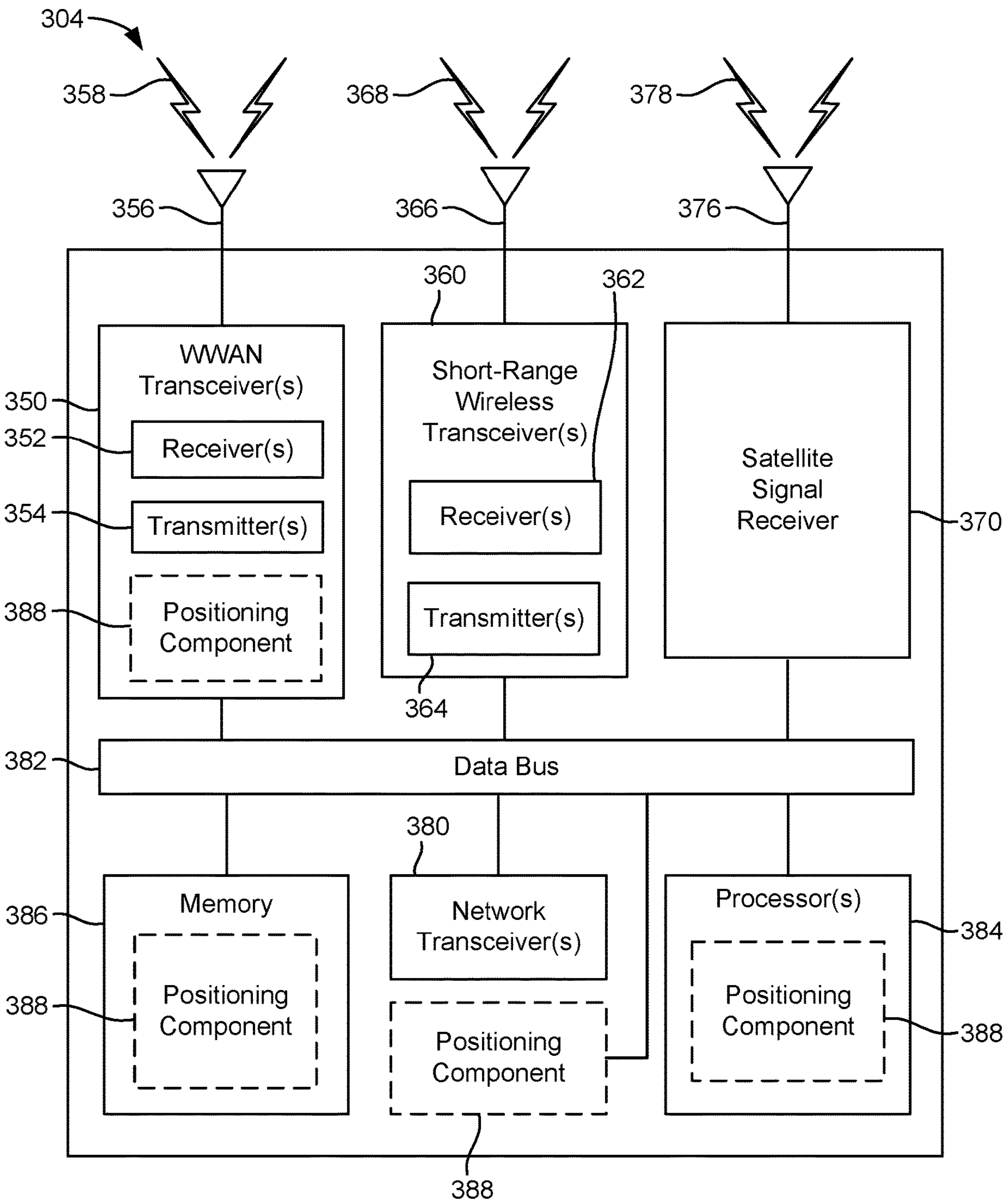
Figure 3C:
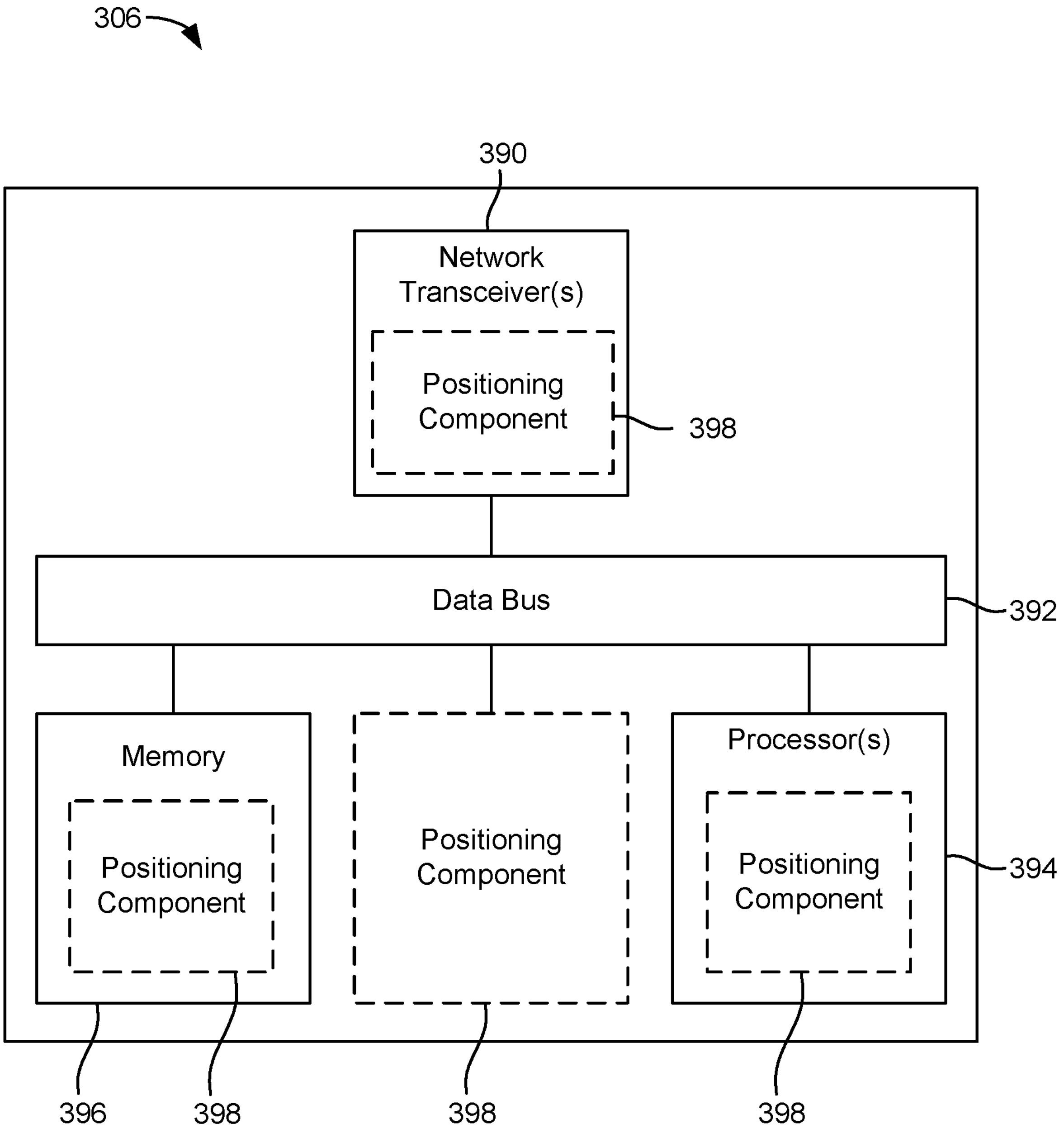

FIG. 3A, FIG. 3B, and FIG. 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum).

The WWAN transceivers 310 and 350 may be variously configured for transmitting and encoding signals 318 and 358 (e.g., messages, indications, information, and so on), respectively, and conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). in some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be $+/-_{500}$ microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4A:
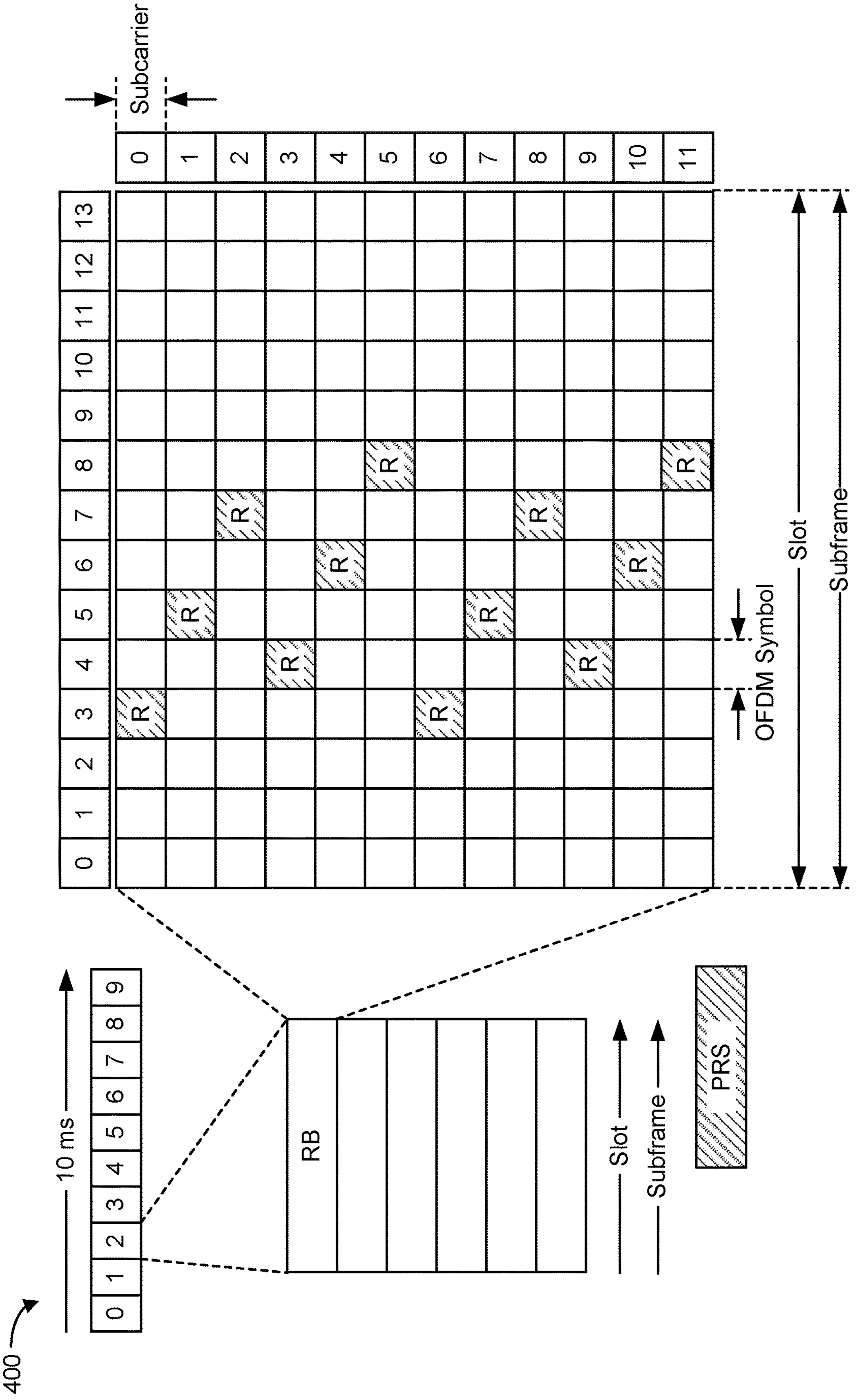
FIGS. 4A to 4D are diagrams illustrating example frame structures and channels within the frame structures, according to aspects of the disclosure.
Figure 4B:
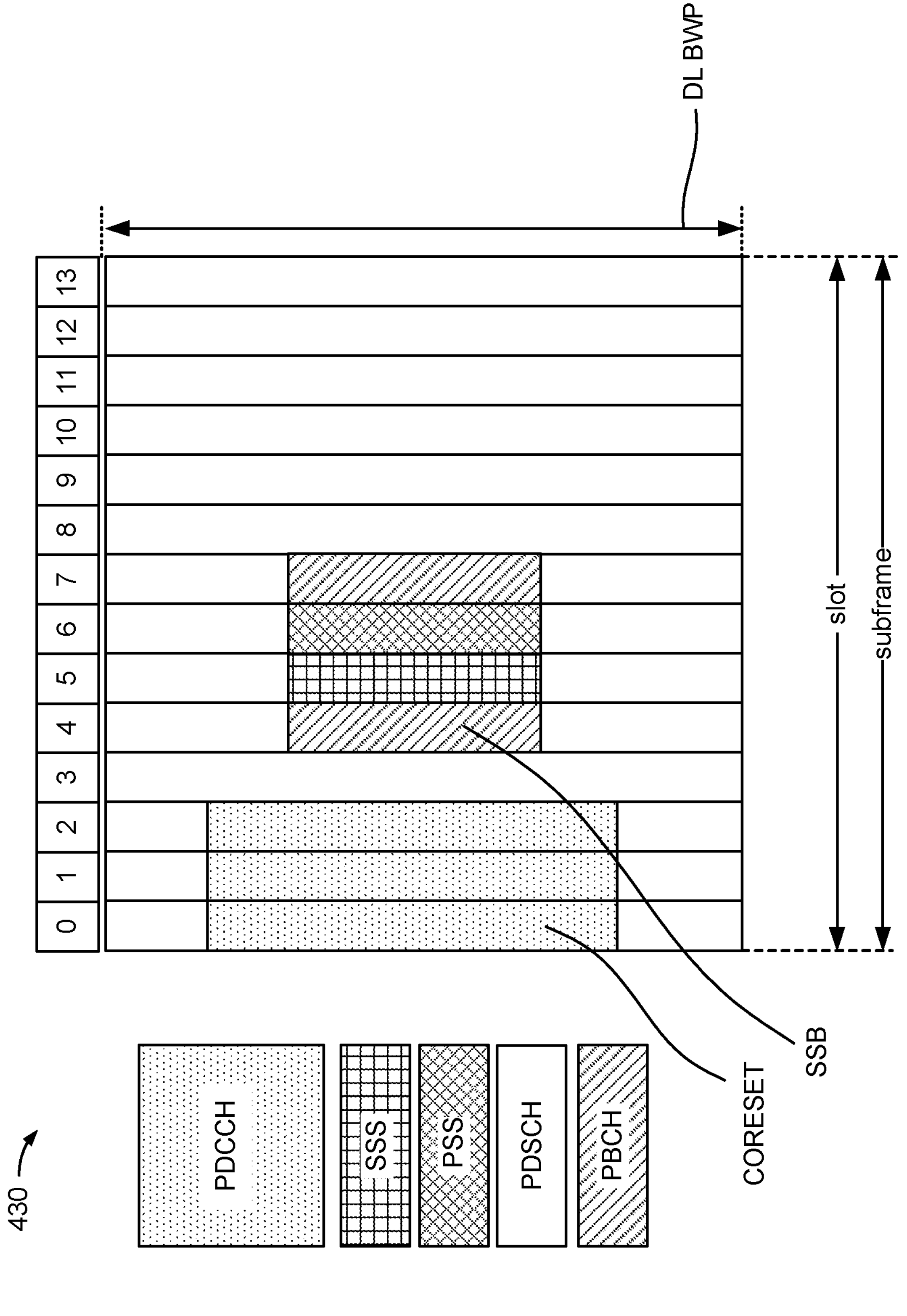
Figure 4C:
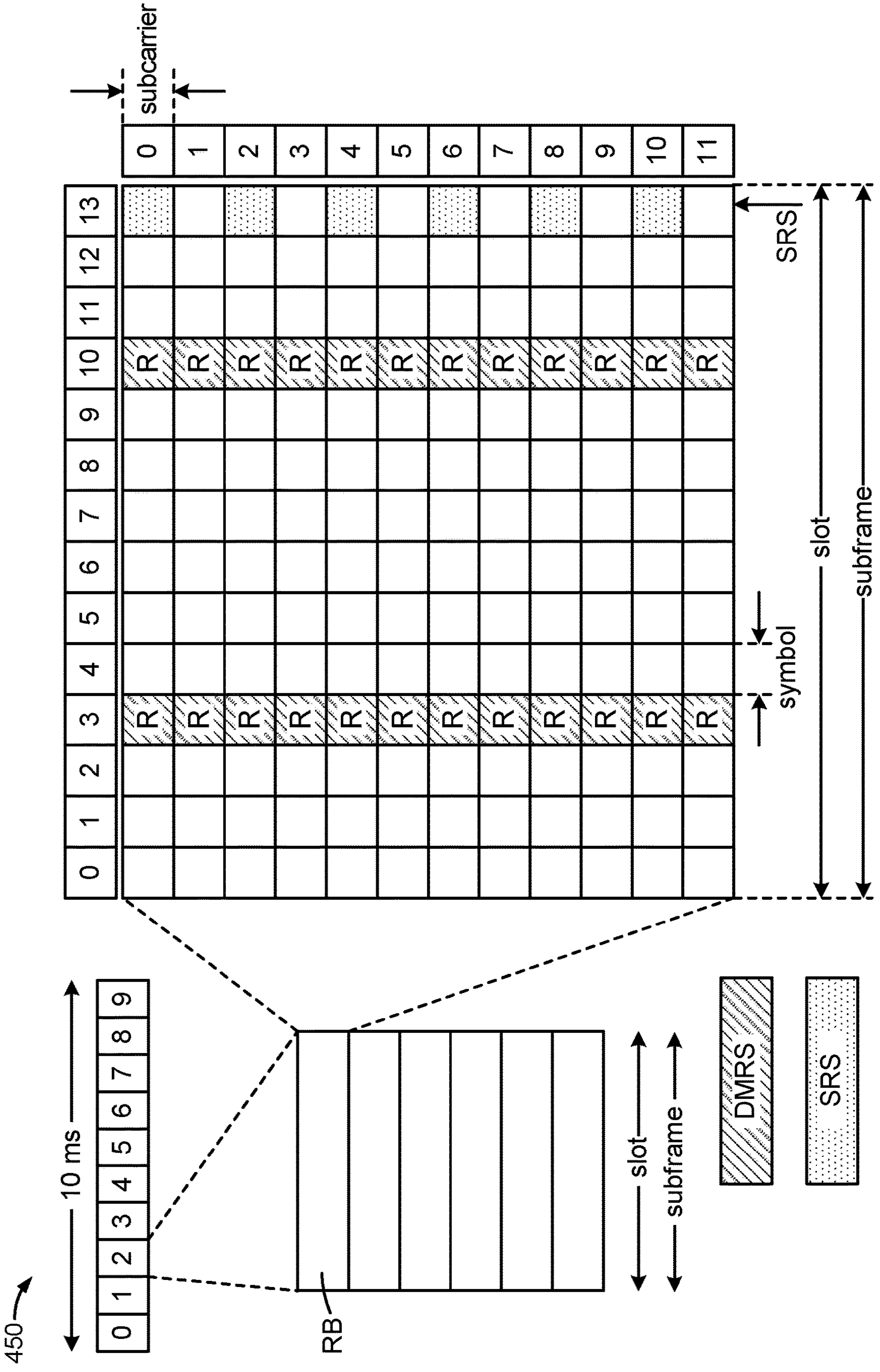
Figure 4D:
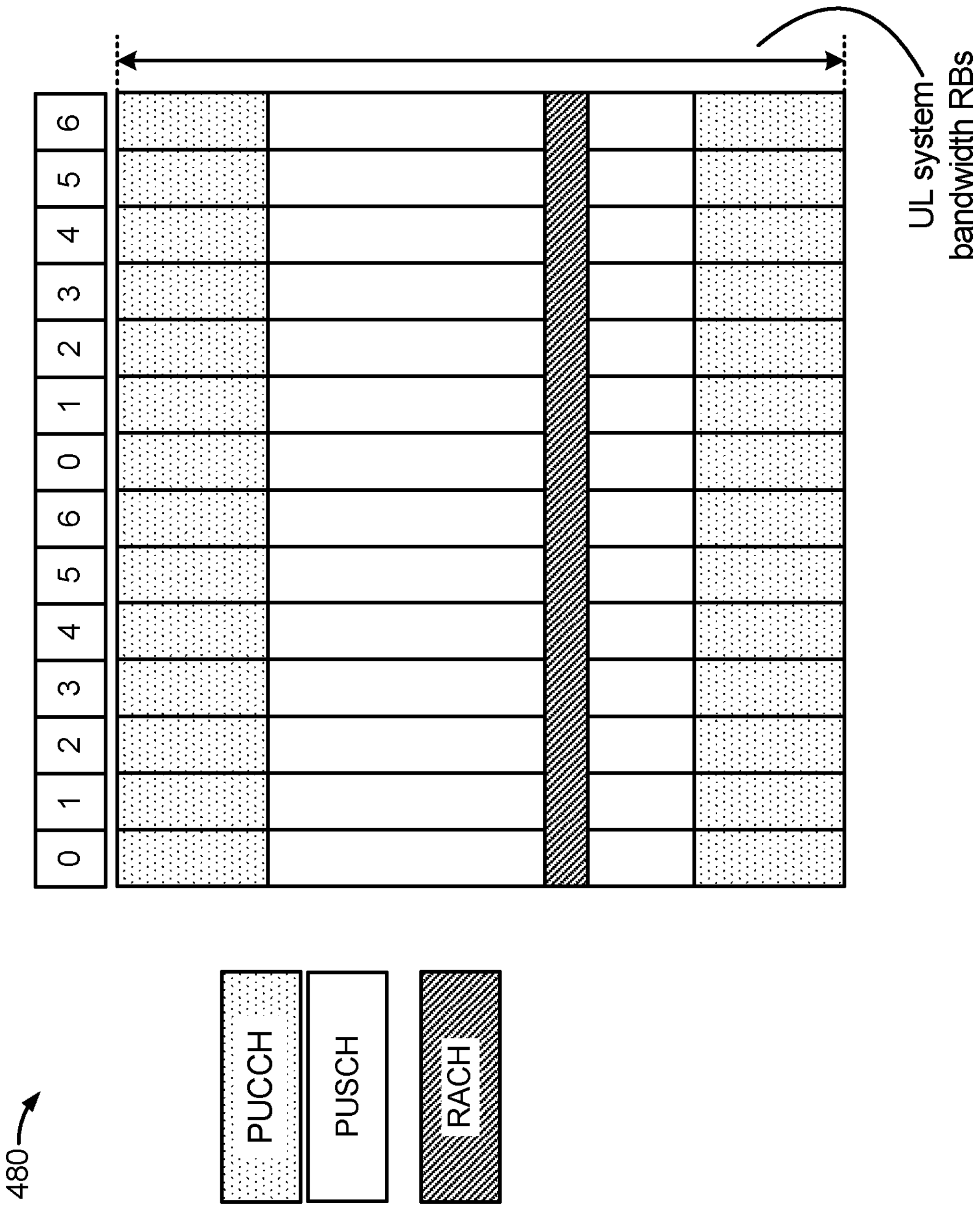

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. FIG. 4C is a diagram 450 illustrating an example of an uplink frame structure, according to aspects of the disclosure. FIG. 4D is a diagram 480 illustrating an example of channels within an uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K)

orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (μ), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (μ=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIGS. 4A to 4D, a numerology of 15 kHz is used. Thus, in the time domain, a 10 ms frame is divided into 10 equally sized subframes of 1 ms each, and each subframe includes one time slot. In FIGS. 4A to 4D, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A to 4D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates example locations of REs carrying PRS (labeled “R”).

A collection of resource elements (REs) that are used for transmission of PRS is referred to as a “PRS resource.” The collection of resource elements can span multiple PRBs in the frequency domain and ‘N’ (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the “comb density”). A comb size ‘N’ represents the subcarrier spacing (or frequency/tone spacing) within each symbol of a PRS resource configuration. Specifically, for a comb size ‘N,’ PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled “R”) indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A “PRS resource set” is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as “PRS-ResourceRepetitionFactor”) across slots. The periodicity is the time from the first repetition of the first PRS resource of a first PRS instance to the same first repetition of the same first PRS resource of the next PRS instance. The periodicity may have a length selected from $2^\mu$*{4, 5, 8, 10, 16, 20, 32, 40, 64, 80, 160, 320, 640, 1280, 2560, 5120, 10240} slots, with μ=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a “PRS resource,” or simply “resource,” also can be referred to as a “beam.” Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

The following are the currently supported DCI formats. Format 0-0: fallback for scheduling of PUSCH; Format 0-1: non-fallback for scheduling of PUSCH; Format 1-0: fallback for scheduling of PDSCH; Format 1-1: non-fallback for scheduling of PDSCH; Format 2-0: notifying a group of UEs of the slot format; Format 2-1: notifying a group of UEs of the PRB(s) and OFDM symbol(s) where the UEs may assume no transmissions are intended for the UEs; Format 2-2: transmission of TPC commands for PUCCH and PUSCH; and Format 2-3: transmission of a group of SRS requests and TPC commands for SRS transmissions. Note that a fallback format is a default scheduling option that has non-configurable fields and supports basic NR operations. In contrast, a non-fallback format is flexible to accommodate NR features.

As will be appreciated, a UE needs to be able to demodulate (also referred to as "decode") the PDCCH in order to read the DCI, and thereby to obtain the scheduling of resources allocated to the UE on the PDSCH and PUSCH. If the UE fails to demodulate the PDCCH, then the UE will not know the locations of the PDSCH resources and it will keep attempting to demodulate the PDCCH using a different set of PDCCH candidates in subsequent PDCCH monitoring occasions. If the UE fails to demodulate the PDCCH after some number of attempts, the UE declares a radio link failure (RLF). To overcome PDCCH demodulation issues, search spaces are configured for efficient PDCCH detection and demodulation.

Generally, a UE does not attempt to demodulate each and very PDCCH candidate that may be scheduled in a slot. To reduce restrictions on the PDCCH scheduler, and at the same time to reduce the number of blind demodulation attempts by the UE, search spaces are configured. Search spaces are indicated by a set of contiguous CCEs that the UE is supposed to monitor for scheduling assignments/grants relating to a certain component carrier. There are two types of search spaces used for the PDCCH to control each component carrier, a common search space (CSS) and a UE-specific search space (USS).

A common search space is shared across all UEs, and a UE-specific search space is used per UE (i.e., a UE-specific search space is specific to a specific UE). For a common search space, a DCI cyclic redundancy check (CRC) is scrambled with a system information radio network temporary identifier (SI-RNTI), random access RNTI (RA-RNTI), temporary cell RNTI (TC-RNTI), paging RNTI (P-RNTI), interruption RNTI (INT-RNTI), slot format indication RNTI (SFI-RNTI), TPC-PUCCH-RNTI, TPC-PUSCH-RNTI, TPC-SRS-RNTI, cell RNTI (C-RNTI), or configured scheduling RNTI (CS-RNTI) for all common procedures. For a UE-specific search space, a DCI CRC is scrambled with a C-RNTI or CS-RNTI, as these are specifically targeted to individual UE.

A UE demodulates the PDCCH using the four UE-specific search space aggregation levels (1, 2, 4, and 8) and the two common search space aggregation levels (4 and 8). Specifically, for the UE-specific search spaces, aggregation level '1' has six PDCCH candidates per slot and a size of six CCEs. Aggregation level '2' has six PDCCH candidates per slot and a size of 12 CCEs. Aggregation level '4' has two PDCCH candidates per slot and a size of eight CCEs. Aggregation level '8' has two PDCCH candidates per slot and a size of 16 CCEs. For the common search spaces, aggregation level '4' has four PDCCH candidates per slot and a size of 16 CCEs. Aggregation level '8' has two PDCCH candidates per slot and a size of 16 CCEs.

Each search space comprises a group of consecutive CCEs that could be allocated to a PDCCH, referred to as a PDCCH candidate. A UE demodulates all of the PDCCH candidates in these two search spaces (USS and CSS) to discover the DCI for that UE. For example, the UE may demodulate the DCI to obtain the scheduled uplink grant information on the PUSCH and the downlink resources on the PDSCH. Note that the aggregation level is the number of REs of a CORESET that carry a PDCCH DCI message, and is expressed in terms of CCEs. There is a one-to-one mapping between the aggregation level and the number of CCEs per aggregation level. That is, for aggregation level '4,' there are four CCEs. Thus, as shown above, if the aggregation level is '4' and the number of PDCCH candidates in a slot is '2,' then the size of the search space is '8' (i.e., 4×2=8).

As illustrated in FIG. 4C, some of the REs (labeled "R") carry DMRS for channel estimation at the receiver (e.g., a base station, another UE, etc.). A UE may additionally transmit SRS in, for example, the last symbol of a slot. The SRS may have a comb structure, and a UE may transmit SRS on one of the combs. In the example of FIG. 4C, the illustrated SRS is comb-2 over one symbol. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 4-symbol comb-2: {0, 1, 0, 1}; 4-symbol comb-4: {0, 2, 1, 3}; 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

A collection of resource elements that are used for transmission of SRS is referred to as an "SRS resource," and may be identified by the parameter "SRS-ResourceId." "The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID ("SRS-ResourceSetId").

Generally, a UE transmits SRS to enable the receiving base station (either the serving base station or a neighboring base station) to measure the channel quality between the UE and the base station. However, SRS also can be used as uplink positioning reference signals for uplink positioning procedures, such as UL-TDOA, multi-RTT, DL-AoA, etc.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

FIG. 4D illustrates an example of various channels within an uplink slot of a frame, according to aspects of the disclosure. A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

During an initial attach to the network, a UE will send a report detailing various capabilities of the UE to the network. One such capability that the UE reports to the network is the UE's capability to process positioning reference signals. Below are listed some of the detailed capabilities that the UE can report:

- Common DL PRS processing capability
- Maximum DL PRS bandwidth in MHz, which is supported and reported by UE.
  - FR1 bands: {5, 10, 20, 40, 50, 80, 100}
  - FR2 bands: {50, 100, 200, 400}
- DL PRS buffering capability: Type 1 or Type 2
  - Type 1—sub-slot/symbol level buffering
  - Type 2—slot level buffering
- Duration of DL PRS symbols N in units of ms a UE can process every T ms assuming maximum DL PRS bandwidth in MHz, which is supported and reported by UE.
  - T: {8, 16, 20, 30, 40, 80, 160, 320, 640, 1280} ms
  - N: {0.125, 0.25, 0.5, 1, 2, 4, 6, 8, 12, 16, 20, 25, 30, 32, 35, 40, 45, 50} ms
  - Comments:
    - A UE reports one combination of (N, T) values per band, where N is a duration of DL PRS symbols in ms processed every T ms for a given maximum bandwidth (B) in MHz supported by UE
    - A UE is not expected to support DL PRS bandwidth that exceeds the reported DL PRS bandwidth value
    - UE DL PRS processing capability is defined for a single positioning frequency layer. UE capability for simultaneous DL PRS processing across positioning frequency layers is not supported in Rel.16 (i.e. for a UE supporting multiple positioning frequency layers, a UE is expected to process one frequency layer at a time)
    - UE DL PRS processing capability is agnostic to DL PRS comb factor configuration
    - The reporting of (N, T) values for maximum BW in MHz is not dependent on SCS
    - If the UE does not indicate this capability for a band or band combination, the UE does not support this positioning method in this band or band combination.
- Maximum number of positioning frequency layers supported by the UE
  - Values: {1, 2, 3, 4} (per UE)
- Support of parallel processing of LTE PRS and NR PRS DL PRS Resources for DL AoD

- Max number of DL PRS Resource Sets per TRP per frequency layer supported by UE.
  - Values={1, 2}
- Max number of TRPs across all positioning frequency layers per UE.
  - Values={4, 6, 12, 16, 24, 32, 64, 128, 256}
- Max number of positioning frequency layers UE supports
  - Values={1, 2, 3, 4}
- DL PRS Resources for DL AoD on a band
- Max number of DL PRS Resources per DL PRS Resource Set
  - Values={2, 4, 8, 16, 32, 64}
    - Note: 16, 32, 64 are only applicable to FR2 bands
- Max number of DL PRS Resources per positioning frequency layer.
  - Values={6, 24, 32, 64, 96, 128, 256, 512, 1024}
    - Note: 6 is only applicable to FR1 bands
- DL PRS Resources for DL AoD on a band combination
- Max number of DL PRS Resources supported by UE across all frequency layers, TRPs and DL PRS Resource Sets for FR1-only.
  - Values={6, 24, 64, 128, 192, 256, 512, 1024, 2048}
    - Note this is reported for FR1 only BC.
- Max number of DL PRS Resources supported by UE across all frequency layers, TRPs and DL PRS Resource Sets for FR2-only.
  - Values={24, 64, 96, 128, 192, 256, 512, 1024, 2048}
    - Note this is reported for FR2 only BC
- Max number of DL PRS Resources supported by UE across all frequency layers, TRPs and DL PRS Resource Sets for FR1 in FR1/FR2 mixed operation.
  - Values={6, 24, 64, 128, 192, 256, 512, 1024, 2048}
    - Note this is reported for BC containing FR1 and FR2 bands
- Max number of DL PRS Resources supported by UE across all frequency layers, TRPs and DL PRS Resource Sets for FR2 in FR1/FR2 mixed operation.
  - Values={24, 64, 96, 128, 192, 256, 512, 1024, 2048}
    - Note this is reported for BC containing FR1 and FR2 bands
- Path Loss Estimate Maintenance per serving cell
- Max number of pathloss estimates that the UE can simultaneously maintain for all the SRS resource sets for positioning per serving cell in addition to the up to four pathloss estimates that the UE maintains per serving cell for the PUSCH/PUCCH/SRS transmissions"
  - Candidate values are {1, 4, 8, 16}
  - Note: SRS in "PUSCH/PUCCH/SRS" refers to SRS configured by SRS-Resource
- Path Loss Estimate Maintenance across all cells
- Max number of pathloss estimates that the UE can simultaneously maintain for all the SRS resource sets for positioning across all cells in addition to the up to four pathloss estimates that the UE maintains per serving cell for the PUSCH/PUCCH/SRS transmissions"
  - Candidate values are {1, 4, 8, 16}
  - Note: SRS in "PUSCH/PUCCH/SRS" refers to SRS configured by SRS-Resource Spatial Relation Maintenance Max Number of maintained spatial relations for all the SRS resource sets for positioning across all serving cells in addition to the spatial relations maintained spatial relations per serving cell for the PUSCH/PUCCH/SRS transmissions.

Values={0,1,2,4,8,16}

Note: component 1 is for all cells across all bands

Note: SRS in "PUSCH/PUCCH/SRS" refers to SRS configured by SRS-Resource

After a random access procedure (e.g., a two-step, three-step, or four-step RACH procedure), the UE is in an RRC CONNECTED state. The RRC protocol is used on the air interface between a UE and a base station. The major functions of the RRC protocol include connection establishment and release functions, broadcast of system information, radio bearer establishment, reconfiguration, and release, RRC connection mobility procedures, paging notification and release, and outer loop power control. In LTE, a UE may be in one of two RRC states (CONNECTED or IDLE), but in NR, a UE may be in one of three RRC states (CONNECTED, IDLE, or INACTIVE). The different RRC states have different radio resources associated with them that the UE can use when it is in a given state. Note that the different RRC states are often capitalized, as above; however, this is not necessary, and these states can also be written in lowercase.

Figure 5:
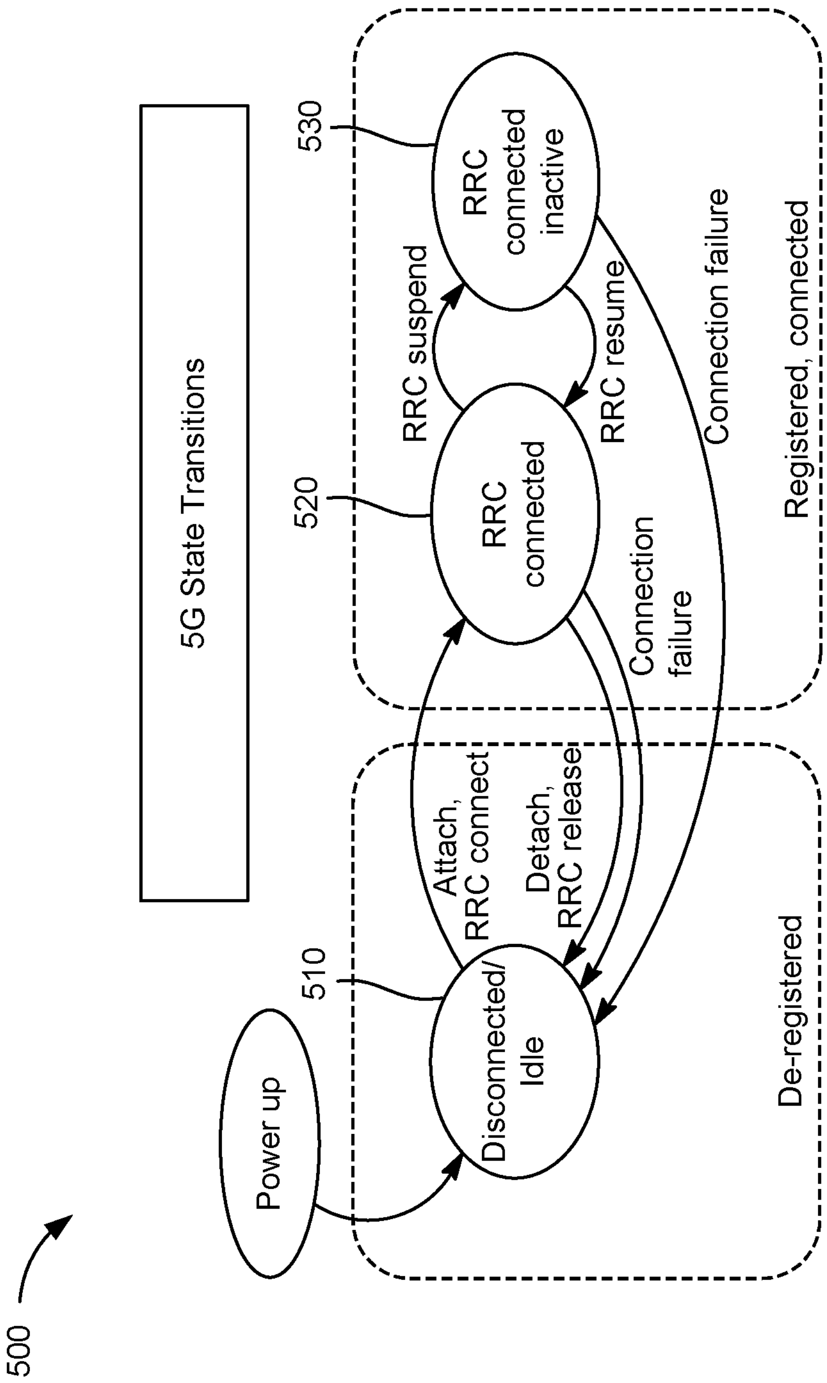
FIG. 5 illustrates the different radio resource control (RRC) states available in New Radio (NR), according to aspects of the disclosure.

FIG. 5 is a diagram 500 of the different RRC states (also referred to as RRC modes) available in NR, according to aspects of the disclosure. When a UE is powered up, it is initially in the RRC DISCONNECTED/IDLE state 510. After a random access procedure, it moves to the RRC CONNECTED state 520. If there is no activity at the UE for a short time, it can suspend its session by moving to the RRC INACTIVE state 530. The UE can resume its session by performing a random access procedure to transition back to the RRC CONNECTED state 520. Thus, the UE needs to perform a random access procedure to transition to the RRC CONNECTED state 520, regardless of whether the UE is in the RRC IDLE state 510 or the RRC INACTIVE state 530.

The operations performed in the RRC IDLE state 510 include public land mobile network (PLMN) selection, broadcast of system information, cell re-selection mobility, paging for mobile terminated data (initiated and managed by the 5GC), discontinuous reception (DRX) for core network paging (configured by non-access stratum (NAS)). The operations performed in the RRC CONNECTED state 520 include 5GC (e.g., 5GC 260) and New RAN (e.g., New RAN 220) connection establishment (both control and user planes), UE context storage at the New RAN and the UE, New RAN knowledge of the cell to which the UE belongs, transfer of unicast data to/from the UE, and network controlled mobility. The operations performed in the RRC INACTIVE state 530 include the broadcast of system information, cell re-selection for mobility, paging (initiated by the New RAN), RAN-based notification area (RNA) management (by the New RAN), DRX for RAN paging (configured by the New RAN), 5GC and New RAN connection establishment for the UE (both control and user planes), storage of the UE context in the New RAN and the UE, and New RAN knowledge of the RNA to which the UE belongs.

Paging is the mechanism whereby the network informs the UE that it has data for the UE. In most cases, the paging process occurs while the UE is in the RRC IDLE state 510 or RRC INACTIVE state 530. This means that the UE needs to monitor whether the network is transmitting any paging message to it. For example, during the IDLE state 510, the UE enters the sleep mode defined in its DRX cycle. The UE periodically wakes up and monitors its paging frame (PF) and paging occasion (PO) within that PF on the PDCCH to check for the presence of a paging message. The PF and PO indicate the time period (e.g., one or more symbols, slots, subframes, etc.) during which the RAN (e.g., serving base station/TRP/cell) will transmit any pages to the UE, and therefore, the time period during which the UE should monitor for pages. The PF and PO are configured to occur periodically, specifically, at least once during each DRX cycle (which is equal to the paging cycle). Although both the PF and PO are needed to determine the time at which to monitor for pages, for simplicity, often only the PO is referenced. If the PDCCH, via the PF and PO, indicates that a paging message is transmitted in the subframe, then the UE needs to demodulate the paging channel (PCH) on the PDSCH to see if the paging message is directed to it.

The PDCCH and PDSCH are transmitted using beam sweeping and repetition. For beam sweeping, within each PO, the paging PDCCH and PDSCH are transmitted on all SSB beams for SSBs transmitted in the cell. This is because when the UE is in the RRC IDLE state 510 or RRC INACTIVE state 530, the base station does not know where in its geographic coverage area the UE is located, and therefore, needs to beamform over its entire geographic coverage area (i.e., on all of its transmit beams). For repetition, the paging PDCCH and PDSCH can be transmitted multiple times on each beam within the PO. Therefore, each PO contains multiple consecutive paging PDCCH monitoring occasions (PMOs).

In NR, positioning is supported in not only the RRC CONNECTED state 520, but also the RRC INACTIVE state 530. A key aspect of INACTIVE state positioning (and the RRC INACTIVE state 530 in general) is that the UE is not associated with a serving base station, but rather, may be within the coverage area of any cell within a RAN paging area (a group of cells that a UE in the RRC INACTIVE state 530 is expected to be in the coverage area of when transitioning from the RRC INACTIVE state 530 to the RRC CONNECTED state 520). As such, the UE does not need to communicate with the network when it moves from one cell within the RAN paging area to another. Benefits to the network of INACTIVE state positioning include faster UE transitions to the CONNECTED state 520 since the network maintains the UE's context (e.g., network identifiers, radio bearers, etc.) while it is in the INACTIVE state 530. Benefits to the UE also include faster transitions to the CONNECTED state 520 and in addition, decreased power consumption, as the UE is only monitoring for pages when in the INACTIVE state 530.

As described above, during a positioning procedure, a UE may receive/measure DL PRS and/or transmit SRS. To receive/measure PRS, the UE needs to be informed of the downlink resources (i.e., specific locations in time and frequency, such as REs, RB s, slots, subframes, etc.) on which the PRS will be transmitted by the TRPs/cells involved in the positioning procedure (i.e., the PRS configuration). Similarly, to transmit SRS, the UE needs to be informed of the uplink resources on which to transmit SRS (i.e., the SRS configuration). A UE generally receives the PRS configuration from the location server via LPP and the SRS configuration from the serving base station via RRC. In either case, the UE needs to be in the RRC CONNECTED state 520 to receive the configurations. Without the PRS and SRS configurations, a UE will not be able to receive/measure PRS or transmit SRS.

Figure 6A:
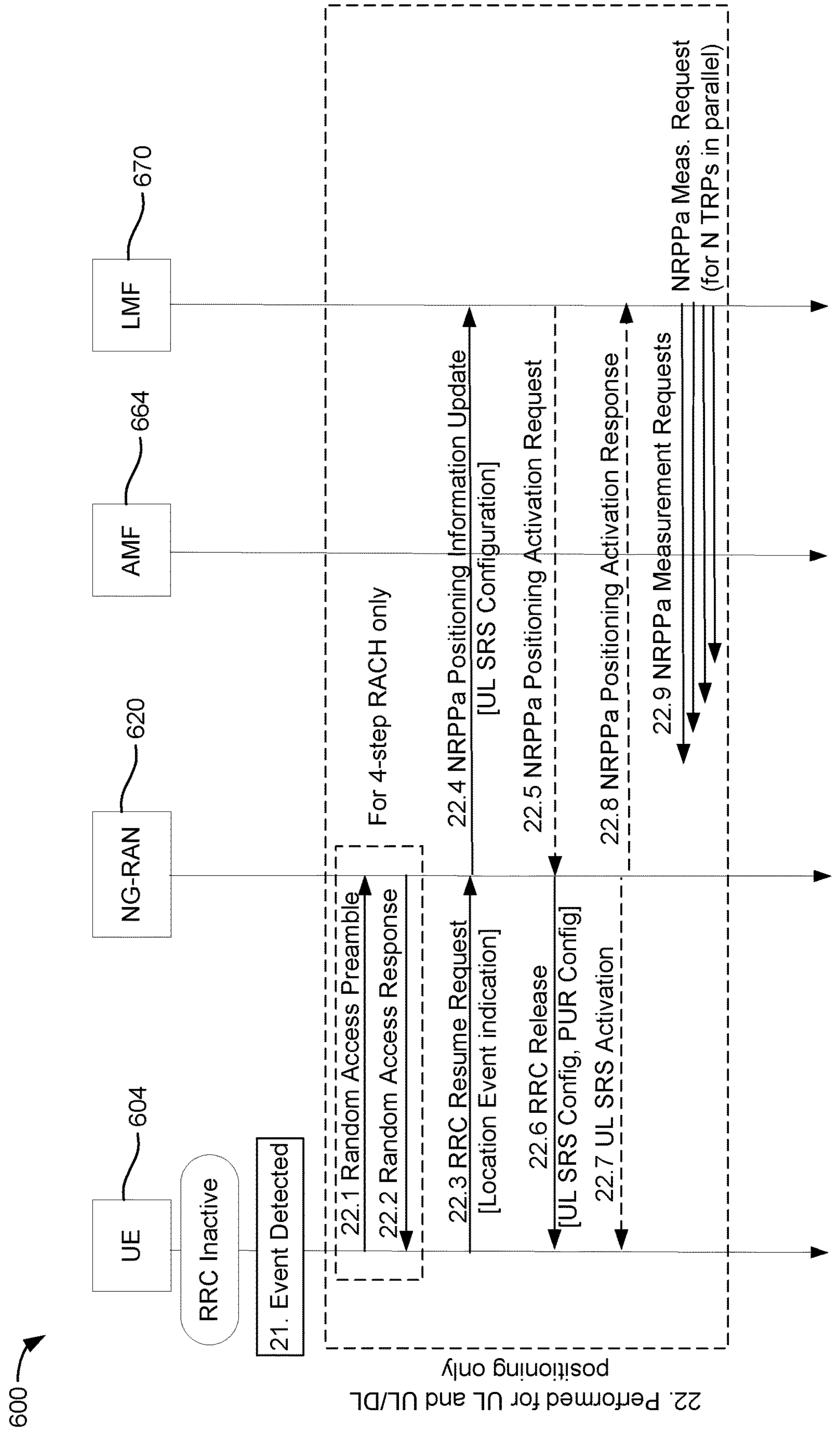
FIGS. 6A and 6B illustrate an example procedure for positioning reference signal configuration in the RRC inactive state, according to aspects of the disclosure.
Figure 6B:
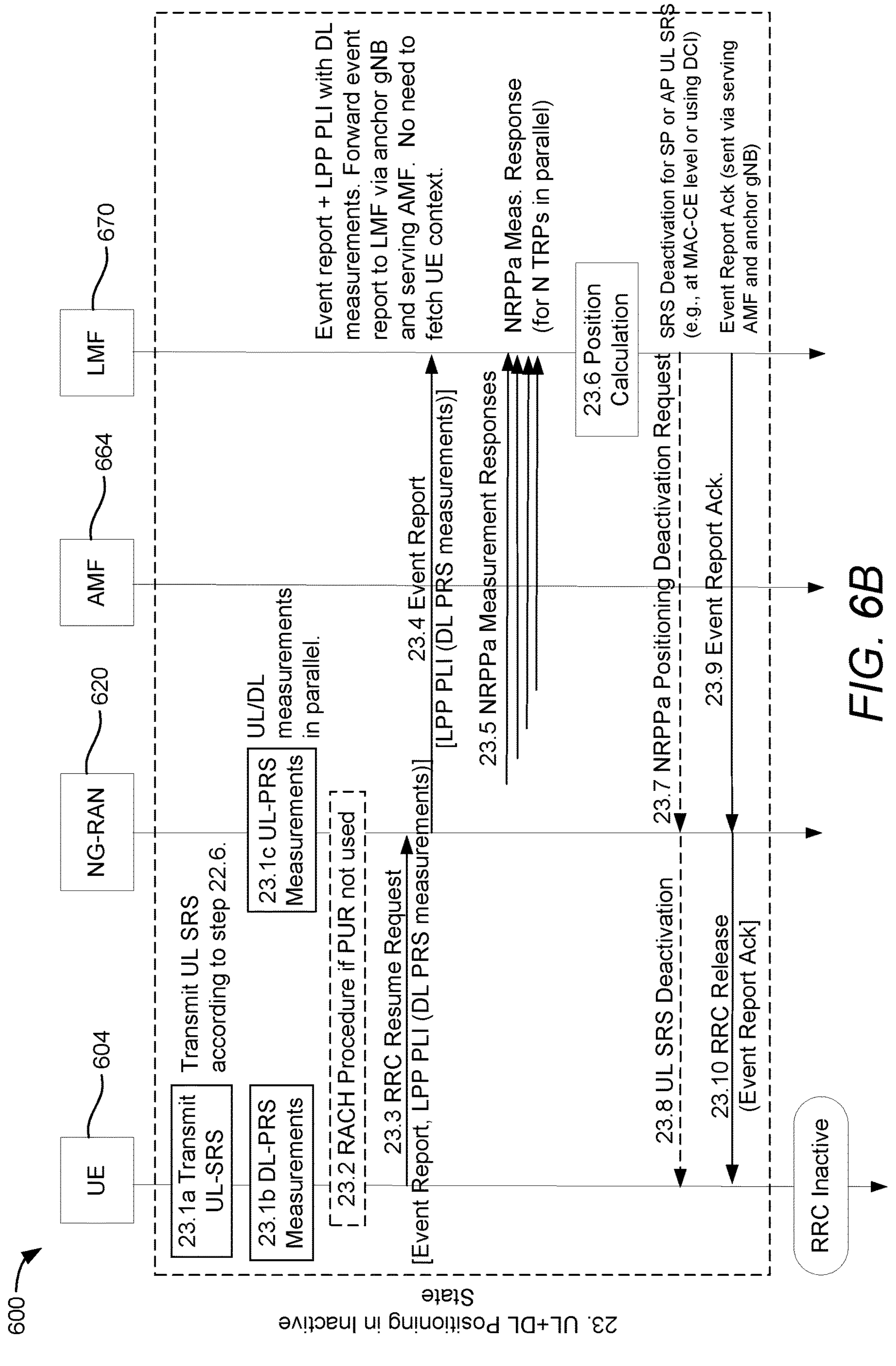

FIG. 6A and FIG. 6B illustrate an example procedure 600 for PRS and/or SRS configuration in the RRC INACTIVE state 530, according to aspects of the disclosure. The procedure 600 is performed by a UE 604 (e.g., any of the UEs described herein), an NG-RAN 620 (e.g., New RAN 220), an AMF 664 (e.g., AMF 264), and an LMF 670 (e.g., LMF 270). Although not illustrated for the sake of simplicity, the NG-RAN 620 may include one or more gNBs, TRPs, cells, and the like.

The procedure 600 begins with the UE 604 in the INACTIVE state 530. At stage 21, a location event is detected. The location event may be a new request for the UE's location (e.g., received from the LMF 670), a periodic positioning procedure, or the like. In response to the detected location event, stage 22 is performed if the location event is for an uplink-only (e.g., UL-TDOA, UL-AoA, etc.) or a downlink-and-uplink-based positioning procedures (e.g., RTT, E-CID, etc.).

If the UE 604 is configured to perform a four-step RACH procedure to transition to the RRC CONNECTED state 520 (as opposed to a two-step or three-step RACH procedure), then at stage 22.1, the UE 604 transmits a random access preamble (the first message of a four-step RACH procedure) to the NG-RAN 620. At stage 22.2, the NG-RAN 620 responds with a random access response message (the second message of a four-step RACH procedure).

At stage 22.3, the UE 604 transmits an RRC resume request to the NG-RAN 620. The RRC resume request includes an indication that the RRC resume request is in response to a location event (i.e., the location event at stage 21). In response to the RRC resume request, if the UE 604 is connecting to a new serving gNB in the same paging area of the NG-RAN 620, the new serving gNB fetches the UE's 604 context from the anchor gNB (which may be a previous serving gNB or an otherwise designated gNB), including any SRS configuration(s). The context may include an SRS configuration for the UE 604 (e.g., based on capabilities of the UE 604). The serving gNB thereby determines the SRS configuration and, at stage 22.4, transmits an NR positioning protocol type A (NRPPa) positioning information update to the LMF 670 (NRPPa is the communication protocol between the NG-RAN 620 and the LMF 670). The NRPPa positioning information update includes the SRS configuration that will be allocated to the UE 604 for the positioning procedure.

For aperiodic (AP) or semi-persistent (SP) positioning, the LMF 670 activates (triggers) the SRS and therefore, at stage 22.5, transmits an NRPPa positioning activation request to the NG-RAN 620 indicating that SRS are to be activated. At stage 22.6, the serving gNB provides the SRS configuration to the UE 604 in an RRC release message. The RRC release message may be the fourth message of a four-step RACH procedure (referred to as "Msg4") or the second message of a two-step RACH procedure (referred to as a "MsgB"). The SRS configuration may be ciphered according to access stratum (AS) ciphering retrieved from the anchor gNB. The RRC release message may optionally include a preconfigured uplink resource (PUR) configuration for a subsequent resume request. After stage 22.6, the UE 604 transitions back into the RRC INACTIVE state 530.

At stage 22.7, the NG-RAN 620 transmits an SRS activation message to the UE 604. The activation may be at the RRC or MAC control element (MAC-CE) level (i.e., the activation message may be an RRC message or a MAC-CE), or may use DCI. At stage 22.8, the NG-RAN 620 transmits an NRPPa positioning activation response to the LMF 670 to confirm that the UE 604 has been activated to transmit SRS on the configured SRS resources. At stage 22.9, the LMF 670 sends NRPPa measurement requests to the TRPs/cells involved in the positioning session (i.e., the TRPs/cells in the NG-RAN 620 expected to measure and report the SRS transmitted by the UE 604). The measurement requests may indicate the time and/or frequency resources on which the UE 604 will transmit the SRS.

Following stage 22 (if performed), stage 23 is performed for both uplink-based and downlink-based positioning when the UE 604 is in the INACTIVE state 530. At stage 23.1*a*, the UE 604 transmits SRS on the time and/or frequency resources indicated in the SRS configuration received at stage 22.6. At stage 23.1*b*, the UE 604 measures DL PRS from TRPs/cells in the NG-RAN 620 (if the UE 604 is performing a downlink-based or downlink-and-uplink-based positioning procedure). At stage 23.1*c*, the NG-RAN 620 (specifically, the involved TRPs/cells) measure the SRS transmitted by the UE 604. The uplink and downlink measurements may occur in parallel.

At stage 23.2, if the UE 604 did not receive a PUR configuration at stage 22.6, the UE 604 performs a RACH procedure to reconnect to the NG-RAN 620. At stage 23.3, the UE 604 transmits an RRC resume request to the NG-RAN 620 (specifically the serving gNB). The RRC resume request includes an event report and an LPP message that includes the measurements of the PRS from stage 23.1*b*. At stage 23.4, the NG-RAN 620 (specifically the serving gNB) forwards the event report to the LMF 670 via the anchor gNB (e.g., the current serving gNB) and serving AMF 664. At stage 23.5, the involved TRPs/cells in the NG-RAN 620 transmit respective measurement responses to the LMF 670. At stage 23.6, the LMF 670 calculates a location of the UE 604 using the measurements received from the UE 604 and the involved TRPs/cells in the NG-RAN 620.

If the SRS are semi-persistent or aperiodic, then at stage 23.7, the LMF 670 transmits an NRPPa positioning deactivation request to the NG-RAN 620. In response, at stage 23.8, the NG-RAN 620 transmits an SRS deactivation command to the UE 604. The deactivation command may be transmitted at the MAC-CE level or using DCI. At stage 23.9, the LMF 670 transmits an event report acknowledgment (ACK) to the NG-RAN 620 (specifically, the anchor gNB) via the serving AMF 664. At stage 23.10, the NG-RAN transmits an RRC release message, including an event report acknowledgment, to the UE 604. Subsequently, the UE 604 transitions back to the RRC INACTIVE state 530.

In the foregoing description, the UE 604 remained in the same RAN paging area. However, if the UE 604 were to leave the RAN paging area, then it would need to connect to the network to obtain new paging information.

DL or DL+UL positioning requires a UE to make positioning-related measurements (e.g., DL-TDoA, Rx-Tx time difference, RSRP, etc.) based on positioning reference signals (e.g., NR PRS, LTE PRS), often from multiple non-collocated TRPs. These measurements can be processing intensive, so there is a need to ensure that the UE has enough processing resources to handle both its regular data communications and the positioning measurements during the same time. One approach is to define collision handling rules and process sharing rules that ensure this. Another approach is to define measurement gaps (MGs) during which regular data communications to the UE are reduced or eliminated, and to have all PRS measurements only occur during those gaps. The latter approach was adopted for Release 16 (Rel. 16). Either approach ensures that the UE does not run out of processing resources while making position-related measurements. In prior versions of the 3GPP standards, a UE in the idle or inactive mode (referred to herein as being in "an RRC unconnected" mode) was required to switch to an RRC connected mode in order to perform positioning measurements (after which the UE could switch back to an RRC unconnected mode), but current standards allow a UE to perform positioning operations in an RRC unconnected mode, to save UE power consumption by avoiding switching to the RRC connected mode.

It was presumed that a UE in an RRC unconnected mode did not need the benefit of an MG, because a UE in an RRC unconnected mode will only be receiving reference and control signals, not data packages, so there was no need for an MG to reduce or suppress data transmissions while the UE was performing positioning tasks such as performing PRS measurements, reporting measurement results, calculating location estimates, and so on. Instead, the UE gets assistance data, e.g., via positioning system information blocks (posSIBs), makes PRS measurements, and for UE-based positioning, computes its own position. The UE may receive dedicated unicast data during the positioning session, e.g., UE-specific updates to the posSIB data. The UE may transmit the measurement values, an estimate of its own position, UL SRS signals, or combinations thereof, while in an RRC unconnected state. During the RACH procedure described in FIG. 5, the UE may indicate that it does not want to enter a connected state, but instead receive data via small data transfer (SDT) in NR or early data traffic (EDT) in LTE.

However, there are circumstances in which a UE in RRC inactive mode may receive a data transmission. For example, a UE in RRC inactive mode may receive a DCI that instructs the UE to measure CSI-RS signals. Such a DCI might collide with PRS measurements being performed by the UE at the same time. The UE may likewise receive MAC-CE messages that could collide with a PRS measurement. Current standards are silent regarding measurement gaps for UEs in RRC unconnected states, perhaps based on a presumption that such messages would not be very large and thus would not take up a significant amount of processing overhead.

Accordingly, the present disclosure provide techniques for RRC inactive and RRC idle mode positioning, particularly with regard to MG requirements and PRS-related capabilities. As a high level summary, the techniques include reusing the RRC connected mode MG definition and associated PRS processing capabilities, reusing the connected mode MG definition with a modified PRS processing capability, and presuming that there is no MG and make some behavioral optimizations for non-connected mode operation.

One technique for RRC inactive and RRC idle mode positioning according to aspects of the disclosure is use a first set of positioning capability parameters for an RRC connected state and a different set of positioning capability parameters for what will be referred to herein as an "RRC unconnected" state, e.g., RRC idle mode or RRC inactive mode.

Figure 7:
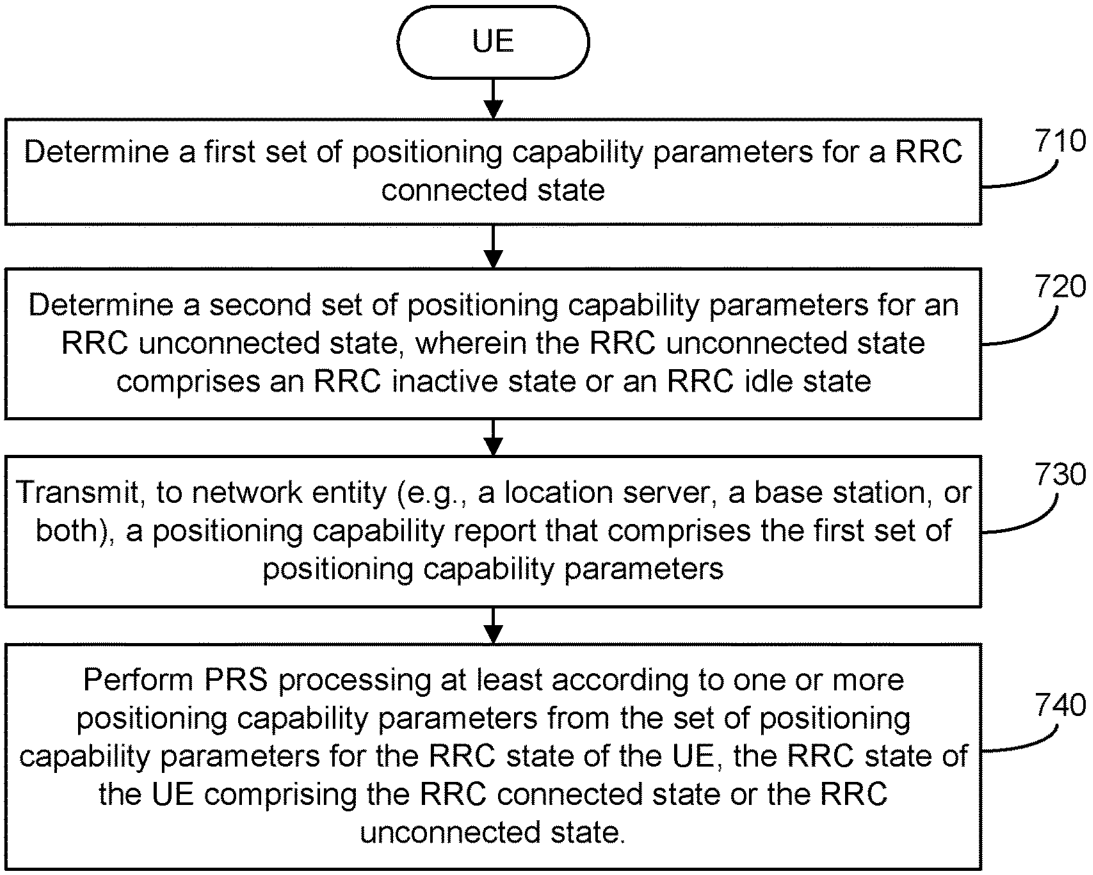
FIGS. 7-9 illustrate example methods of wireless communication, according to aspects of the disclosure.

FIG. 7 is a flowchart of an example process 700 associated with RRC inactive and RRC idle mode positioning configuration, according to aspects of the disclosure. In some implementations, one or more process blocks of FIG. 7 may be performed by a UE (e.g., UE 104). In some implementations, one or more process blocks of FIG. 7 may be performed by another device or a group of devices separate from or including the UE. Additionally, or alternatively, one or more process blocks of FIG. 7 may be performed by one or more components of UE 302, such as processor(s) 332, memory 340, WWAN transceiver(s) 310, short-range wireless transceiver(s) 320, satellite signal receiver 330, sensor(s) 344, user interface 346, and positioning component(s) 342, any or all of which may be means for performing the operations of process 700.

As shown in FIG. 7, process 700 may include determining a first set of positioning capability parameters for an RRC connected state (block 710). Means for performing the operation of block 710 may include the processor(s) 332, memory 340, or WWAN transceiver(s) 310 of the UE 302. For example, the UE 302 may receive the first set of positioning capability parameters for the RRC connected state via the receiver(s) 312 and store the parameters into the memory 340, or the UE 302 may have been previously configured with the parameters, which may already be stored in the memory 340.

As further shown in FIG. 7, process 700 may include determining a second set of positioning capability parameters for an RRC unconnected state, wherein the RRC unconnected state comprises an RRC inactive state or an RRC idle state (block 720). Means for performing the operation of block 720 may include the processor(s) 332, memory 340, or WWAN transceiver(s) 310 of the UE 302. For example, the UE 302 may receive the second set of positioning capability parameters via the receiver(s) 312, or the UE 302 may generate the second set of capability parameters using the processor(s) 332, e.g., by modifying one or more parameters of the first set of capability parameters stored the memory 340, and storing the second set of capability parameters into the memory 340.

In some aspects, determining the second set of positioning capability parameters comprises modifying at least one positioning capability parameter value in the first set of positioning capability parameters to create the second set of positioning capability parameters.

In some aspects, the first set of positioning capability parameters and the second set of positioning capability parameters differ in at least one of a measurement gap repetition period (MGRP), a measurement gap length (MGL), a ratio of MGL to MGRP, a number of PRS resources per symbol that the UE can process, a number of PRS symbols per time window that the UE can process, a retuning gap, a channel collision rule that defines a priority of a PRS resource relative to a non-PRS resource, or a processing budget rule.

As further shown in FIG. 7, process 700 may include transmitting, to a network entity, which may comprise a location server, a base station, or both, a positioning capability report that comprises the first set of positioning capability parameters (block 730). Means for performing the operation of block 730 may include the processor(s) 332, memory 340, or WWAN transceiver(s) 310 of the UE 302. For example, the UE 302 may transmit, the positioning capability report using the transmitter(s) 314.

In some aspects, the UE may also transmit the second set of positioning capability parameters. In some aspects, the second set of positioning capability parameters are transmitted as part of the positioning capability report.

In some aspects, transmitting the positioning capability report further comprises transmitting an indication that the UE requires a measurement gap to perform PRS processing or transmitting an indication that the UE does not require a measurement gap to perform PRS processing.

As further shown in FIG. 7, process 700 may include changing the RRC state of the UE to a new RRC state, the new RRC state comprising the RRC connected state or the RRC unconnected state (block 740). Means for performing the operation of block 740 may include the processor(s) 332, memory 340, or WWAN transceiver(s) 310 of the UE 302. For example, the UE 302 may change the RRC state using the processor(s) 332.

In some aspects, changing the RRC state of the UE to the new RRC state further comprises transmitting, to the network entity, an indication to use the set of positioning capability parameters for the new RRC state.

As further shown in FIG. 7, process 700 may include performing PRS processing at least according to one or more positioning capability parameters from the set of positioning capability parameters for the new RRC state (block 750). Means for performing the operation of block 750 may include the processor(s) 332, memory 340, or WWAN transceiver(s) 310 of the UE 302. For example, the UE 302 may perform PRS processing using the receiver(s) 312 and the processor(s) 332.

In some aspects, performing PRS processing according to the set of positioning capability parameters for the new RRC state comprises performing PRS processing in the RRC connected state according to the first set of positioning capability parameters and performing PRS processing in the RRC unconnected state according to the second set of positioning capability parameters.

In some aspects, performing PRS processing comprises performing PRS processing also according to a measurement gap (MG) configuration that defines at least one MG.

In some aspects, performing PRS processing comprises performing PRS processing at least according to one or more positioning capability parameters from to the set of positioning capability parameters for the new RRC state and according to a measurement gap (MG) configuration that defines at least one MG.

In some aspects, performing PRS processing during the RRC unconnected state comprises using a number of PRS resources per slot, PRS symbols per time window, maximum bandwidth, type-1 or type-2 PRS buffering behavior, or combinations thereof, which are the same as those used when performing PRS processing during the RRC connected state.

Process 700 may include additional implementations, such as any single implementation or any combination of implementations described below and/or in connection with one or more other processes described elsewhere herein. Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Another technique for RRC inactive and RRC idle mode positioning according to aspects of the disclosure is to reuse the RRC connected mode PRS processing capabilities, as well as the RRC connected mode MG definitions, if a MG is required. In this technique, channel collision rules, processing budget rules, or both, may be the same as for a connected mode, e.g., the UE is expected to perform PRS processing only within a MG which is triggered by the serving base station. In some aspects, the UE may presume the same number of PRS resources per slot, PRS symbols per time window, maximum bandwidth, or type-1/type-2 PRS buffering behavior as for connected mode. In some aspects, the MG configuration may be delivered to the UE via SDT/EDT or via another RAT (e.g., WiFi, etc.). It is noted that large MG sizes can be configured without them interfering with the needed data processing.

In some aspects, the UE may reuse the connected mode MG definition, but with a modified PRS processing capability. This technique acknowledges the fact that, in RRC inactive mode, a UE may be more flexible regarding the length of a measurement gap, may be able to process a different number of PRS resources per symbol or a different number of PRS symbols per time window. For example, in RRC inactive mode, the UE may allow a larger MG length, since the UE is not anticipating receiving data while it is in RRC inactive mode and thus has more resources to apply to positioning activities. Alternatively, the UE may desire a smaller MG length, e.g., so that the UE does not spend much energy on positioning activities and can thus save power while in the RRC inactive mode. Likewise, in RRC inactive mode, the UE may desire to process fewer PRS resources per symbol, fewer PRS symbols per time window, or both, in order to save power. Alternatively, the UE may be able to process a larger number of PRS resources per symbol, a larger number of PRS symbols per time window, or both, since transmissions on the other channels are not expected to be received. In some aspects, during the initialization of the PRS procedure in RRC Idle/Inactive mode (e.g., within the Location Request triggering), a UE may send a capabilities report that indicates the UE's PRS processing capabilities and whether the UE requires an MG to be assigned in order for the UE to have the resources to do the processing. In some aspects, the UE may report separate sets of capabilities, one or more for RRC connected mode and one or more for RRC inactive mode. In some aspects, the UE may include a low-bandwidth (e.g., 1-bit) indicator that identifies which set of capabilities to use, e.g.,: PRS capabilities for RRC connected mode vs PRS capabilities for RRC idle/inactive mode; enhanced PRS capabilities for RRC idle/inactive mode vs reduced PRS capabilities for RRC idle/inactive Mode; a maximum MG length (MGL) to MG repetition period (MGRP) ratio for RRC connected mode versus for RRC idle/inactive mode; etc.

In some aspects, the UE may presume that there is no MG and make some behavioral optimizations for non-connected mode operation. In some aspects, channel collision and processing budget rules for connected mode can be modified for idle/inactive mode. For example: if, in connected mode, when MG is not present, the PRS has higher priority than unicast data/CSIRS/TRS, in RRC Inactive/Idle, the PRS processing has lower priority since all the data that are received during this mode are expected to be "important" or "crucial". In some aspects, the UE may report capabilities related to PRS processing without MG that are applicable for use during a non-connected-mode, and can report separate capabilities for PRS processing without MG for use during a connected mode. Examples of the capabilities that can be adjusted based on whether the UE is in a connected or non-connected mode include any of the capabilities listed above as being reported by the UE. In some aspects, a UE may not need a measurement gap to reduce or eliminate data transmissions so that the UE has enough processing resources to perform positioning tasks, but the UE may nevertheless need a timing gap for other purposes, such as a retuning gap (e.g., to allow the UE transceiver to change-over from wideband operation to narrowband operation), a symbol-based required gap to ensure enough time for the UE to retune between other channels (PDCCH, PDSCH) and the PRS in RRC Inactive/Idle, or a timing gap for some other purpose. In some aspects, such as where there is no gap between the PRS and other PHY channels/signals, for example, then the UE may modify its priority rules, e.g., to prioritize PRS reception over another PHY signal/channel or vice versa. In some aspects, whether PRS is prioritized over the other channel or vice versa may depend on the PHY signal/channel. In one example, where a PDCCH is close to a PRS, the PDCCH is prioritized; where a PDSCH is close to a PRS, the PDSCH is prioritized; where a CSIRS is close to a PRS, the PRS is prioritized; and so on. These priority rules are illustrative and not limiting.

Figure 8:
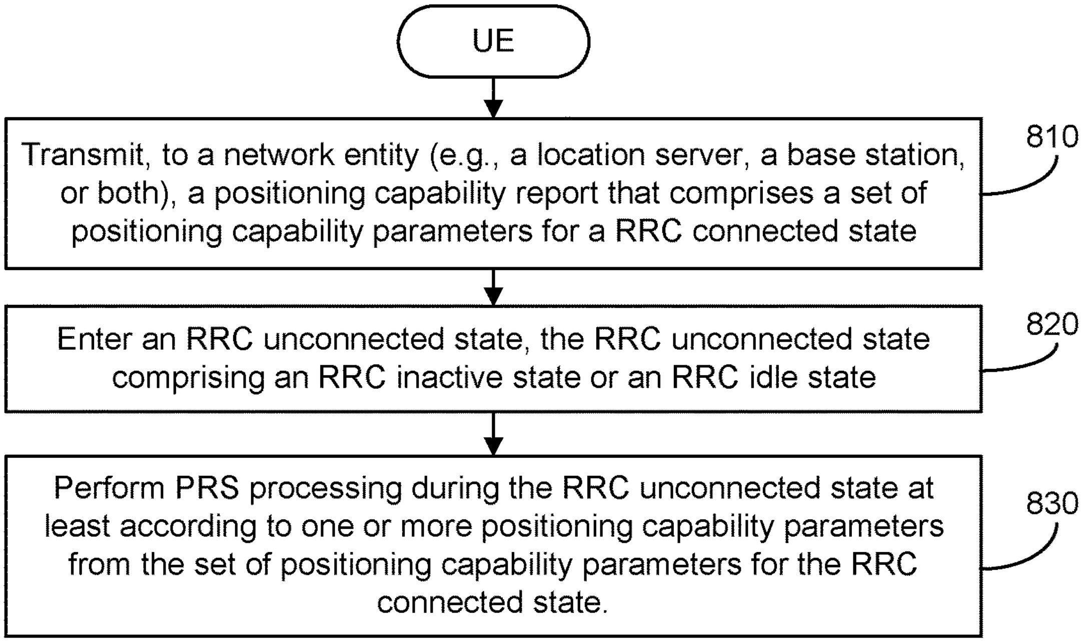

FIG. 8 is a flowchart of an example process 800 associated with RRC inactive and RRC idle mode positioning configuration, according to aspects of the disclosure. In some implementations, one or more process blocks of FIG. 8 may be performed by a UE (e.g., UE 104). In some implementations, one or more process blocks of FIG. 8 may be performed by another device or a group of devices separate from or including the UE. Additionally, or alternatively, one or more process blocks of FIG. 8 may be performed by one or more components of UE 302, such as processor(s) 332, memory 340, WWAN transceiver(s) 310, short-range wireless transceiver(s) 320, satellite signal receiver 330, sensor(s) 344, user interface 346, and positioning component(s) 342, any or all of which may be means for performing the operations of process 800.

As shown in FIG. 8, process 800 may include transmitting, to a network entity, which may comprise a location server, a base station, or both, a positioning capability report that comprises a set of positioning capability parameters for an RRC connected state (block 810). Means for performing the operation of block 810 may include the processor(s) 332, memory 340, or WWAN transceiver(s) 310 of the UE 302. For example, the UE 302 may transmit the capability report using the transmitter(s) 314.

As further shown in FIG. 8, process 800 may include entering an RRC unconnected state, the RRC unconnected state comprising an RRC inactive state or an RRC idle state (block 820). Means for performing the operation of block 820 may include the processor(s) 332, memory 340, or WWAN transceiver(s) 310 of the UE 302. For example, the processor(s) 332 may execute instructions that cause the UE 302 to enter an RRC unconnected state.

As further shown in FIG. 8, process 800 may include performing PRS processing during the RRC unconnected state at least according to one or more positioning capability parameters from the set of positioning capability parameters for the RRC connected state (block 830). Means for performing the operation of block 830 may include the processor(s) 332, memory 340, or WWAN transceiver(s) 310 of the UE 302. For example, the UE 302 may perform PRS processing using the receiver(s) 312 and the processor(s) 332, according to parameters stored in the memory 340.

In some aspects, performing PRS processing during the RRC unconnected state comprises performing PRS processing according to one or more positioning capability parameters from the set of positioning capability parameters for the RRC connected state and a measurement gap (MG) configuration that defines at least one MG.

In some aspects, performing PRS processing during the RRC unconnected state comprises using at least one of channeling collision rules which are the same as those used when performing PRS processing during the RRC connected state, or processing budget rules which are the same as those used when performing PRS processing during the RRC connected state.

In some aspects, performing PRS processing during the RRC unconnected state comprises using a number of PRS resources per slot, PRS symbols per time window, maximum bandwidth, type-1 or type-2 PRS buffering behavior, or combinations thereof, which are the same as those used when performing PRS processing during the RRC connected state.

Process 800 may include additional implementations, such as any single implementation or any combination of implementations described below and/or in connection with one or more other processes described elsewhere herein. Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
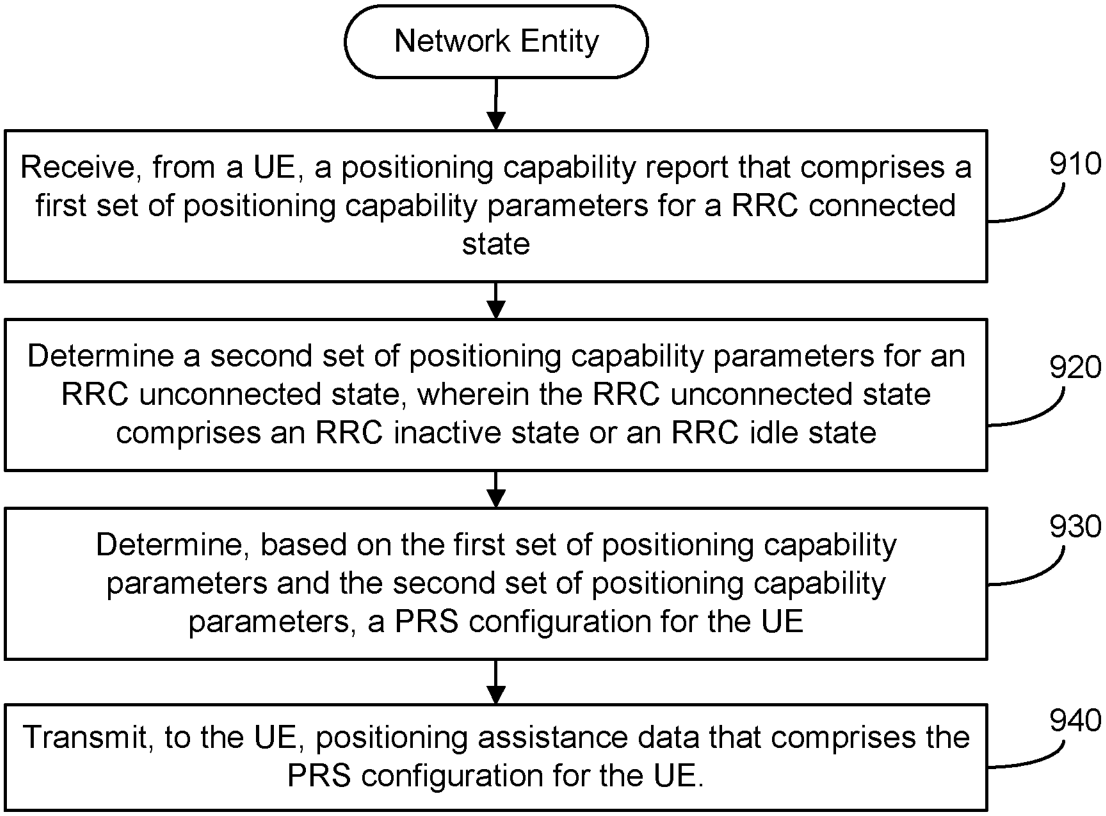

FIG. 9 is a flowchart of an example process 900 associated with RRC inactive and RRC idle mode positioning configuration, according to aspects of the disclosure. In some implementations, one or more process blocks of FIG. 9 may be performed by a network entity (e.g., location server 172, which may be a part of a gNB or other base station). In some implementations, one or more process blocks of FIG. 9 may be performed by another device or a group of devices separate from or including the network node. Additionally, or alternatively, one or more process blocks of FIG. 9 may be performed by one or more components of the network entity 306, such as the network transceiver(s) 390, the processor(s) 394, the memory 396, and the positioning component(s) 398, any or all of which may be means for performing the operations of process 900.

As shown in FIG. 9, process 900 may include receiving, from a user equipment (UE), a positioning capability report that comprises a first set of positioning capability parameters for a radio resource control (RRC) connected state (block 910). Means for performing the operation of block 910 may include the network transceiver(s) 390, the processor(s) 394, the memory 396, and the positioning component(s) 398 of network entity 306. For example, the network entity 306 may receive, from a user equipment (UE), the positioning capability report using the network transceiver(s) 390.

As further shown in FIG. 9, process 900 may include determining a second set of positioning capability parameters for an RRC unconnected state, wherein the RRC unconnected state comprises an RRC inactive state or an RRC idle state (block 920). Means for performing the operation of block 920 may include the network transceiver(s) 390, the processor(s) 394, the memory 396, and the positioning component(s) 398 of network entity 306. For example, in some aspects, the network entity 306 may receive the second set of positioning capability parameters from the UE via the network transceiver(s) 390, e.g., as part of the positioning capability report. In some aspects, the processor(s) 394 of network entity 306 may generate the second set of positioning capability parameters by modifying at least one positioning capability parameter value in the first set of positioning capability parameters to create the second set of positioning capability parameters.

In some aspects, the first set of positioning capability parameters and the second set of positioning capability parameters differ in at least one of a measurement gap repetition period (MGRP), a measurement gap length (MGL), a ratio of MGL to MGRP, a number of PRS resources per symbol that the UE can process, a number of PRS symbols per time window that the UE can process, a retuning gap, a channel collision rule that defines a priority of a PRS resource relative to a non-PRS resource, or a processing budget rule.

As further shown in FIG. 9, process 900 may include determining, based on the first set of positioning capability parameters and the second set of positioning capability parameters, a positioning reference signal (PRS) configuration for the UE (block 930). Means for performing the operation of block 930 may include the network transceiver(s) 390, the processor(s) 394, the memory 396, and the positioning component(s) 398 of network entity 306. For example, the network entity 306 may determine the PRS configuration for the UE, using the processor(s) 394.

As further shown in FIG. 9, process 900 may include transmitting, to the UE, positioning assistance data that comprises the PRS configuration for the UE (block 940). Means for performing the operation of block 940 may include the network transceiver(s) 390, the processor(s) 394, the memory 396, and the positioning component(s) 398 of network entity 306. For example, the network entity 306 may transmit the positioning assistance data to the UE via the network transceiver(s) 390.

In some aspects, process 900 includes sending, to a base station that serves the UE, a recommendation that the UE be in the RRC connected state or that the UE be the RRC unconnected state.

Process 900 may include additional implementations, such as any single implementation or any combination of implementations described below and/or in connection with one or more other processes described elsewhere herein. Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

As will be appreciated, a technical advantage of the processes 700, 800, and 900 is increased positioning performance (e.g., reduced latency, reduced power consumption, etc.) since the UE can receive updated positioning parameters while remaining in the RRC unconnected state. In some aspects, the UE can optimize positioning capability parameters or other operational parameters for operating while in the RRC unconnected state.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), the method comprising: determining a first set of positioning capability parameters for a radio resource control (RRC) connected state; determining a second set of positioning capability parameters for an RRC unconnected state, wherein the RRC unconnected state comprises an RRC inactive state or an RRC idle state; transmitting, to a network entity, a positioning capability report that comprises the first set of positioning capability parameters; and performing positioning reference signal (PRS) processing at least according to one or more positioning capability parameters from the set of positioning capability parameters for the RRC state of the UE, the RRC state of the UE comprising the RRC connected state or the RRC unconnected state.

Clause 2. The method of clause 1, wherein performing PRS processing according to the set of positioning capability parameters for the RRC state comprises performing PRS processing in the RRC connected state according to the first set of positioning capability parameters and performing PRS processing in the RRC unconnected state according to the second set of positioning capability parameters.

Clause 3. The method of any of clauses 1 to 2, wherein performing PRS processing comprises performing PRS processing at least according to one or more positioning capability parameters from to the set of positioning capability parameters for the RRC state and according to a measurement gap (MG) configuration that defines at least one MG.

Clause 4. The method of any of clauses 1 to 3, wherein determining the second set of positioning capability parameters comprises modifying at least one positioning capability parameter value in the first set of positioning capability parameters to create the second set of positioning capability parameters.

Clause 5. The method of any of clauses 1 to 4, wherein the first set of positioning capability parameters and the second set of positioning capability parameters differ in at least one of: a measurement gap repetition period (MGRP); a measurement gap length (MGL); a ratio of MGL to MGRP; a number of PRS resources per symbol that the UE can process; a number of PRS symbols per time window that the UE can process; a retuning gap; a channel collision rule that defines a priority of a PRS resource relative to a non-PRS resource; or a processing budget rule.

Clause 6. The method of any of clauses 1 to 5, wherein transmitting the positioning capability report further comprises transmitting the second set of positioning capability parameters.

Clause 7. The method of any of clauses 1 to 6, wherein transmitting the positioning capability report further comprises transmitting an indication that the UE requires a measurement gap to perform PRS processing or transmitting an indication that the UE does not require a measurement gap to perform PRS processing.

Clause 8. The method of any of clauses 1 to 7, further comprising transmitting, to the network entity, an indication to use the set of positioning capability parameters for the RRC state of the UE.

Clause 9. The method of any of clauses 1 to 8, wherein performing PRS processing during the RRC unconnected state comprises using a number of PRS resources per slot, PRS symbols per time window, maximum bandwidth, type-1 or type-2 PRS buffering behavior, or combinations thereof, which are the same as those used when performing PRS processing during the RRC connected state.

Clause 10. A method of wireless communication performed by a network entity, the method comprising: receiving, from a user equipment (UE), a positioning capability report that comprises a first set of positioning capability parameters for a radio resource control (RRC) connected state; determining a second set of positioning capability parameters for an RRC unconnected state, wherein the RRC unconnected state comprises an RRC inactive state or an RRC idle state; determining, based on the first set of positioning capability parameters and the second set of positioning capability parameters, a positioning reference signal (PRS) configuration for the UE; and transmitting, to the UE, positioning assistance data that comprises the PRS configuration for the UE.

Clause 11. The method of any of clauses 11 to 10, wherein determining the second set of positioning capability parameters comprises receiving the second set of positioning capability parameters from the UE.

Clause 12. The method of any of clauses 12 to 11, wherein receiving the second set of positioning capability parameters from the UE comprises receiving the second set of positioning capability parameters as part of the positioning capability report.

Clause 13. The method of any of clauses 11 to 12, wherein determining the second set of positioning capability parameters comprises modifying at least one positioning capability parameter value in the first set of positioning capability parameters to create the second set of positioning capability parameters.

Clause 14. The method of any of clauses 11 to 13, wherein the first set of positioning capability parameters and the second set of positioning capability parameters differ in at least one of: a measurement gap repetition period (MGRP); a measurement gap length (MGL); a ratio of MGL to MGRP; a number of PRS resources per symbol that the UE can process; a number of PRS symbols per time window that the UE can process; a retuning gap; a channel collision rule that defines a priority of a PRS resource relative to a non-PRS resource; or a processing budget rule.

Clause 15. The method of any of clauses 11 to 14, further comprising sending, to a base station that serves the UE, a recommendation that the UE be in the RRC connected state or that the UE be the RRC unconnected state.

Clause 16. The method of any of clauses 11 to 15, wherein the network entity comprises a location server, a base station, or both.

Clause 17. A user equipment (UE), comprising: a memory; at least one transceiver; and at least one processor communicatively coupled to the memory and the at least one transceiver, the at least one processor configured to: determine a first set of positioning capability parameters for a radio resource control (RRC) connected state; determine a second set of positioning capability parameters for an RRC unconnected state, wherein the RRC unconnected state comprises an RRC inactive state or an RRC idle state; transmit, via the at least one transceiver, a positioning capability report to a network entity, the positioning capability report comprising the first set of positioning capability parameters; and perform positioning reference signal (PRS) processing at least according to one or more positioning capability parameters from the set of positioning capability parameters for the RRC state of the UE, the RRC state of the UE comprising the RRC connected state or the RRC unconnected state.

Clause 18. The UE of any of clauses 18 to 17, wherein performing PRS processing according to the set of positioning capability parameters for the RRC state comprises performing PRS processing in the RRC connected state according to the first set of positioning capability parameters and performing PRS processing in the RRC unconnected state according to the second set of positioning capability parameters.

Clause 19. The UE of clause 18, wherein, to perform PRS processing, the at least one processor is configured to perform PRS processing at least according to one or more positioning capability parameters from to the set of positioning capability parameters for the RRC state and according to a measurement gap (MG) configuration that defines at least one MG.

Clause 20. The UE of any of clauses 18 to 19, wherein, to determine the second set of positioning capability parameters, the at least one processor is configured to modify at least one positioning capability parameter value in the first set of positioning capability parameters to create the second set of positioning capability parameters.

Clause 21. The UE of any of clauses 18 to 20, wherein the first set of positioning capability parameters and the second set of positioning capability parameters differ in at least one of: a measurement gap repetition period (MGRP); a measurement gap length (MGL); a ratio of MGL to MGRP; a number of PRS resources per symbol that the UE can process; a number of PRS symbols per time window that the UE can process; a retuning gap; a channel collision rule that defines a priority of a PRS resource relative to a non-PRS resource; or a processing budget rule.

Clause 22. The UE of any of clauses 18 to 21, wherein, to transmit the positioning capability report, the at least one processor is configured to transmit the second set of positioning capability parameters.

Clause 23. The UE of any of clauses 18 to 22, wherein, to transmit the positioning capability report, the at least one processor is configured to transmit an indication that the UE requires a measurement gap in order for the UE to perform PRS processing or transmitting an indication that the UE does not require a measurement gap in order for the UE to perform PRS processing.

Clause 24. The UE of any of clauses 18 to 23, wherein the at least one processor is further configured to transmit, to the network entity, an indication to use the set of positioning capability parameters for the RRC state.

Clause 25. The UE of any of clauses 18 to 24, wherein performing PRS processing during the RRC unconnected state comprises using a number of PRS resources per slot, PRS symbols per time window, maximum bandwidth, type-1 or type-2 PRS buffering behavior, or combinations thereof, which are the same as those used when performing PRS processing during the RRC connected state.

Clause 26. A user equipment (UE), comprising: means for determining a first set of positioning capability parameters for a radio resource control (RRC) connected state; means for determining a second set of positioning capability parameters for an RRC unconnected state, wherein the RRC unconnected state comprises an RRC inactive state or an RRC idle state; means for transmitting, to a network entity, a positioning capability report that comprises the first set of positioning capability parameters; and means for performing positioning reference signal (PRS) processing at least according to one or more positioning capability parameters from the set of positioning capability parameters for the RRC state of the UE, the RRC state of the UE comprising the RRC connected state or the RRC unconnected state.

Clause 27. The UE of any of clauses 27 to 26, wherein the means for performing PRS processing comprises means for performing PRS processing at least according to one or more positioning capability parameters from to the set of positioning capability parameters for the RRC state and according to a measurement gap (MG) configuration that defines at least one MG.

Clause 28. The UE of clause 27, wherein the means for transmitting the positioning capability report further comprises means for transmitting the second set of positioning capability parameters.

Clause 29. The UE of any of clauses 27 to 28, further comprising means for transmitting, to the network entity, an indication to use the set of positioning capability parameters for the RRC state of the UE.

Clause 30. The UE of any of clauses 27 to 29, wherein the means for performing PRS processing during the RRC unconnected state comprises means for using a number of PRS resources per slot, PRS symbols per time window, maximum bandwidth, type-1 or type-2 PRS buffering behavior, or combinations thereof, which are the same as those used when performing PRS processing during the RRC connected state.

Clause 31. A non-transitory computer-readable medium storing computer-executable instructions that, when executed by a user equipment (UE), cause the UE to: determine a first set of positioning capability parameters for a radio resource control (RRC) connected state; determine a second set of positioning capability parameters for an RRC unconnected state, wherein the RRC unconnected state comprises an RRC inactive state or an RRC idle state; transmit, to a network entity, a positioning capability report that comprises the first set of positioning capability parameters; and perform positioning reference signal (PRS) processing at least according to one or more positioning capability parameters from the set of positioning capability parameters for the RRC state of the UE, the RRC state of the UE comprising the RRC connected state or the RRC unconnected state.

Clause 32. The non-transitory computer-readable medium of any of clauses 37 to 31, wherein the first set of positioning capability parameters and the second set of positioning capability parameters differ in at least one of: a measurement gap repetition period (MGRP); a measurement gap length (MGL); a ratio of MGL to MGRP; a number of PRS resources per symbol that the UE can process; a number of PRS symbols per time window that the UE can process; a retuning gap; a channel collision rule that defines a priority of a PRS resource relative to a non-PRS resource; or a processing budget rule.

Clause 33. An apparatus comprising a memory, a transceiver, and a processor communicatively coupled to the memory and the transceiver, the memory, the transceiver, and the processor configured to perform a method according to any of clauses 1 to 16.

Clause 34. An apparatus comprising means for performing a method according to any of clauses 1 to 16.

Clause 35. A non-transitory computer-readable medium storing computer-executable instructions, the computer-executable comprising at least one instruction for causing a computer or processor to perform a method according to any of clauses 1 to 16.

Additional aspects include the following:

In an aspect, a method of wireless communication performed by a user equipment (UE) includes transmitting a positioning capability report to a location server, the positioning capability report including a set of positioning capability parameters for a radio resource control (RRC) connected state; and performing PRS processing during a RRC unconnected state at least according to one or more positioning capability parameters from the set of positioning capability parameters for the RRC connected state and a measurement gap (MG) configuration that defines at least one MG. In some aspects, the RRC unconnected state comprises an RRC inactive state or an RRC idle state. In some aspects, the MG configuration was received via small data transfer (SDT) or early data traffic (EDT). In some aspects, PRS processing is performed using channel collision and processing budget rules which are the same as those applicable to the PRS processing when performed within a RRC connected state. In some aspects, PRS processing is performed using a number of PRS resources per slot, PRS symbols per time window, maximum bandwidth, type-1 or type-2 PRS buffering behavior, or combinations thereof, which are the same as those applicable to the PRS processing when performed within RRC connected state.

In an aspect, a method of wireless communication performed by a user equipment (UE) includes transmitting a positioning capability report to a location server, the positioning capability report including a first set of positioning capability parameters for a radio resource control (RRC) connected state and a second set of positioning capability parameters for a RRC unconnected state; entering an RRC connected state or an RRC unconnected state; and performing PRS processing at least according to one or more positioning capability parameters from to the set of positioning capability parameters for the current RRC state and a measurement gap (MG) configuration that defines at least one MG. In some aspects, performing PRS processing according to the set of positioning capability parameters for the current RRC state comprises performing PRS processing in the RRC connected state according to the set of positioning capability parameters for RRC connected state and performing PRS processing in the RRC unconnected state according to the set of positioning capability parameters for RRC unconnected state. In some aspects, the first set of positioning capability parameters for the RRC connected state and a second set of positioning capability parameters for the RRC unconnected state differ in at least one of: a length of a measurement gap (MGL); a length of a MG repetition period (MGRP); a ratio of MGL over MGRP; a number of PRS resources per symbol; and a number of PRS symbols per time window. In some aspects, the positioning capability report indicates whether the UE requires a measurement gap in order for the UE to perform the PRS processing. In some aspects, upon entering the RRC connected state or the RRC unconnected state, the UE transmits, to the location server, an indication to use at least one or more positioning capability parameters from the first set of positioning capability parameters for a RRC connected state or the second set of positioning capability parameters for a RRC unconnected state, respectively.

In an aspect, a method of wireless communication performed by a user equipment (UE) includes transmitting a positioning capability report to a location server, the positioning capability report including a set of positioning capability parameters for a radio resource control (RRC) connected state; modifying at least one positioning capability parameter; and performing PRS processing during a RRC unconnected state at least according to one or more positioning capability parameters from the set of positioning capability parameters for the RRC connected state and the at least one modified positioning capability parameter. In some aspects, modifying the at least one positioning capability parameter comprises modifying: a number of PRS resources per symbol; a number of PRS symbols per time window; a channel collision rule; or a processing budget rule. In some aspects, modifying the at least one positioning capability parameter comprises modifying a channel collision rule that defines a priority of a PRS resource relative to a non-PRS resource. In some aspects, modifying the at least one positioning capability parameter comprises defining a retuning gap.

In an aspect, a user equipment (UE) includes a memory; at least one transceiver; and at least one processor communicatively coupled to the memory and the at least one transceiver, the at least one processor configured to: transmit a positioning capability report to a location server, the positioning capability report including a set of positioning capability parameters for a radio resource control (RRC) connected state; perform PRS processing during a RRC unconnected state at least according to one or more positioning capability parameters from the set of positioning capability parameters for the RRC connected state and a measurement gap (MG) configuration that defines at least one MG. In some aspects, the RRC unconnected state comprises an RRC inactive state or an RRC idle state. In some aspects, the MG configuration was received via small data transfer (SDT) or early data traffic (EDT). In some aspects, PRS processing is performed using channel collision and processing budget rules which are the same as those applicable to the PRS processing when performed within the RRC connected state. In some aspects, PRS processing is performed using a number of PRS resources per slot, PRS symbols per time window, maximum bandwidth, type-1 or type-2 PRS buffering behavior, or combinations thereof, which are the same as those applicable to the PRS processing when performed within the RRC connected state.

In an aspect, a user equipment (UE) includes a memory; at least one transceiver; and at least one processor communicatively coupled to the memory and the at least one transceiver, the at least one processor configured to: transmit a positioning capability report to a location server, the positioning capability report including a first set of positioning capability parameters for a radio resource control (RRC) connected state and a second set of positioning capability parameters for a RRC unconnected state; enter an RRC connected state or an RRC unconnected state; and perform PRS processing at least according to one or more positioning capability parameters from the set of positioning capability parameters for the current RRC state and a measurement gap (MG) configuration that defines at least one MG. In some aspects, performing PRS processing according to the set of positioning capability parameters for the current RRC state comprises performing PRS processing in the RRC connected state according to the set of positioning capability parameters for RRC connected state and performing PRS processing in the RRC unconnected state according to the set of positioning capability parameters for RRC unconnected state. In some aspects, the first set of positioning capability parameters for the RRC connected state and a second set of positioning capability parameters for the RRC unconnected state differ in at least one of: a length of a measurement gap (MGL); a length of a MG repetition period (MGRP); a ratio of MGL over MGRP; a number of PRS resources per symbol; and a number of PRS symbols per time window. In some aspects, the positioning capability report indicates whether the UE requires a measurement gap in order for the UE to perform the PRS processing. In some aspects, upon entering the RRC connected state or the RRC unconnected state, the UE transmits, to the location server, an indication to use at least one or more positioning capability parameters from the first set of positioning capability parameters for a RRC connected state or the second set of positioning capability parameters for a RRC unconnected state, respectively.

In an aspect, a user equipment (UE) includes a memory; at least one transceiver; and at least one processor communicatively coupled to the memory and the at least one transceiver, the at least one processor configured to: transmit a positioning capability report to a location server, the positioning capability report including a set of positioning capability parameters for a radio resource control (RRC) connected state; modify at least one positioning capability parameter; and perform PRS processing during a RRC unconnected state at least according to one or more positioning capability parameters from the set of positioning capability parameters for the RRC connected state and the at least one modified positioning capability parameter. In some aspects, the at least one processor, when modifying the at least one positioning capability parameter, is configured to modify: a number of PRS resources per symbol; a number of PRS symbols per time window; a channel collision rule; or a processing budget rule. In some aspects, the at least one processor, when modifying the at least one positioning capability parameter, is configured to modify a channel collision rule that defines a priority of a PRS resource relative to a non-PRS resource. In some aspects, the at least one processor, when modifying the at least one positioning capability parameter, is configured to define a retuning gap.

In an aspect, an apparatus comprising means for performing a method according to any of claims 1 to 14.

In an aspect, a non-transitory computer-readable medium storing computer-executable instructions, the computer-executable comprising at least one instruction for causing a computer or processor to perform a method according to any of claims 1 to 14.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), the method comprising:

determining a first set of positioning capability parameters for a radio resource control (RRC) connected state;

determining a second set of positioning capability parameters for an RRC unconnected state, wherein the RRC unconnected state comprises an RRC inactive state or an RRC idle state, and wherein the first set of positioning capability parameters for the RRC connected state and the second set of positioning capability parameters for the RRC unconnected state differ in a number of positioning reference signal (PRS) symbols per time window and a number of PRS resources per slot that the UE can process;

transmitting, to a network entity, a positioning capability report that comprises the first set of positioning capability parameters; and performing PRS processing at least according to one or more positioning capability parameters from a set of positioning capability parameters for an RRC state of the UE, the RRC state of the UE comprising the RRC connected state or the RRC unconnected state.

2. The method of claim 1, wherein performing PRS processing according to the set of positioning capability parameters for the RRC state comprises performing PRS processing in the RRC connected state according to the first set of positioning capability parameters and performing PRS processing in the RRC unconnected state according to the second set of positioning capability parameters.

3. The method of claim 1, wherein performing PRS processing comprises performing PRS processing at least according to the one or more positioning capability parameters from the set of positioning capability parameters for the RRC state and according to a measurement gap (MG) configuration that defines at least one MG.

4. The method of claim 1, wherein determining the second set of positioning capability parameters comprises modifying at least one positioning capability parameter value in the first set of positioning capability parameters to create the second set of positioning capability parameters.

5. The method of claim 1, wherein the first set of positioning capability parameters and the second set of positioning capability parameters further differ in at least one of:

a measurement gap repetition period (MGRP);

a measurement gap length (MGL);

a ratio of MGL to MGRP;

a number of PRS resources per symbol that the UE can process;

a retuning gap;

a channel collision rule that defines a priority of a PRS resource relative to a non-PRS resource; or a processing budget rule.

6. The method of claim 1, wherein transmitting the positioning capability report further comprises transmitting the second set of positioning capability parameters.

7. The method of claim 1, wherein transmitting the positioning capability report further comprises transmitting an indication that the UE requires a measurement gap to perform PRS processing or transmitting an indication that the UE does not require a measurement gap to perform PRS processing.

8. The method of claim 1, further comprising transmitting, to the network entity, an indication to use the set of positioning capability parameters for the RRC state of the UE.

9. The method of claim 1, wherein performing PRS processing during the RRC unconnected state comprises processing the number of PRS resources per slot, the number of PRS symbols per time window, a maximum bandwidth, type-1 or type-2 PRS buffering behavior, or combinations thereof.

10. A method of wireless communication performed by a network entity, the method comprising:

receiving, from a user equipment (UE), a positioning capability report that comprises a first set of positioning capability parameters for a radio resource control (RRC) connected state;

determining a second set of positioning capability parameters for an RRC unconnected state, wherein the RRC unconnected state comprises an RRC inactive state or an RRC idle state, and wherein the first set of positioning capability parameters for the RRC connected state and the second set of positioning capability parameters for the RRC unconnected state differ in a number of positioning reference signal (PRS) symbols per time window and a number of PRS resources per slot that the UE can process;

determining, based on the first set of positioning capability parameters and the second set of positioning capability parameters, a PRS configuration for the UE; and transmitting, to the UE, positioning assistance data that comprises the PRS configuration for the UE.

11. The method of claim 10, wherein determining the second set of positioning capability parameters comprises receiving the second set of positioning capability parameters from the UE.

12. The method of claim 11, wherein receiving the second set of positioning capability parameters from the UE comprises receiving the second set of positioning capability parameters as part of the positioning capability report.

13. The method of claim 10, wherein determining the second set of positioning capability parameters comprises modifying at least one positioning capability parameter value in the first set of positioning capability parameters to create the second set of positioning capability parameters.

14. The method of claim 10, wherein the first set of positioning capability parameters and the second set of positioning capability parameters further differ in at least one of:

a measurement gap repetition period (MGRP);

a measurement gap length (MGL);

a ratio of MGL to MGRP;

a number of PRS resources per symbol that the UE can process;

a retuning gap;

a channel collision rule that defines a priority of a PRS resource relative to a non-PRS resource; or a processing budget rule.

15. The method of claim 10, further comprising sending, to a base station that serves the UE, a recommendation that the UE be in the RRC connected state or that the UE be the RRC unconnected state.

16. The method of claim 10, wherein the network entity comprises a location server, a base station, or both.

17. A user equipment (UE), comprising:

one or more memories;

one or more transceivers; and one or more processors communicatively coupled to the one or more memories and the one or more transceivers, the one or more processors, either alone or in combination, configured to:

determine a first set of positioning capability parameters for a radio resource control (RRC) connected state;

determine a second set of positioning capability parameters for an RRC unconnected state, wherein the RRC unconnected state comprises an RRC inactive state or an RRC idle state, and wherein the first set of positioning capability parameters for the RRC connected state and the second set of positioning capability parameters for the RRC unconnected state differ in a number of positioning reference signal (PRS) symbols per time window and a number of PRS resources per slot that the UE can process;

transmit, via the one or more transceivers, a positioning capability report to a network entity, the positioning capability report comprising the first set of positioning capability parameters; and perform PRS processing at least according to one or more positioning capability parameters from a set of positioning capability parameters for an RRC state of the UE, the RRC state of the UE comprising the RRC connected state or the RRC unconnected state.

18. The UE of claim 17, wherein performing PRS processing according to the set of positioning capability parameters for the RRC state comprises performing PRS processing in the RRC connected state according to the first set of positioning capability parameters and performing PRS processing in the RRC unconnected state according to the second set of positioning capability parameters.

19. The UE of claim 17, wherein, to perform PRS processing, the one or more processors, either alone or in combination, are configured to perform PRS processing at least according to one or more positioning capability parameters from the set of positioning capability parameters for the RRC state and according to a measurement gap (MG) configuration that defines at least one MG.

20. The UE of claim 17, wherein, to determine the second set of positioning capability parameters, the one or more processors, either alone or in combination, are configured to modify at least one positioning capability parameter value in the first set of positioning capability parameters to create the second set of positioning capability parameters.

21. The UE of claim 17, wherein the first set of positioning capability parameters and the second set of positioning capability parameters further differ in at least one of:

a measurement gap repetition period (MGRP);

a measurement gap length (MGL);

a ratio of MGL to MGRP;

a number of PRS resources per symbol that the UE can process;

a retuning gap;

a channel collision rule that defines a priority of a PRS resource relative to a non-PRS resource; or a processing budget rule.

22. The UE of claim 17, wherein, to transmit the positioning capability report, the one or more processors, either alone or in combination, are configured to transmit the second set of positioning capability parameters.

23. The UE of claim 17, wherein, to transmit the positioning capability report, the one or more processors, either alone or in combination, are configured to transmit an indication that the UE requires a measurement gap in order for the UE to perform PRS processing or transmitting an indication that the UE does not require a measurement gap in order for the UE to perform PRS processing.

24. The UE of claim 17, wherein the one or more processors, either alone or in combination, are further configured to transmit, to the network entity, an indication to use the set of positioning capability parameters for the RRC state.

25. The UE of claim 17, wherein the one or more processors configured to perform PRS processing during the RRC unconnected state comprises the one or more processors, either alone or in combination, configured to process the number of PRS resources per slot, the number of PRS symbols per time window, a maximum bandwidth, type-1 or type-2 PRS buffering behavior, or combinations thereof.

26. A user equipment (UE), comprising:

means for determining a first set of positioning capability parameters for a radio resource control (RRC) connected state;

means for determining a second set of positioning capability parameters for an RRC unconnected state, wherein the RRC unconnected state comprises an RRC inactive state or an RRC idle state, and wherein the first set of positioning capability parameters for the RRC connected state and the second set of positioning capability parameters for the RRC unconnected state differ in a number of positioning reference signal (PRS) symbols per time window and a number of PRS resources per slot that the UE can process;

means for transmitting, to a network entity, a positioning capability report that comprises the first set of positioning capability parameters; and means for performing PRS processing at least according to one or more positioning capability parameters from a set of positioning capability parameters for an RRC state of the UE, the RRC state of the UE comprising the RRC connected state or the RRC unconnected state.

27. The UE of claim 26, wherein the means for performing PRS processing comprises means for performing PRS processing at least according to one or more positioning capability parameters from the set of positioning capability parameters for the RRC state and according to a measurement gap (MG) configuration that defines at least one MG.

28. The UE of claim 26, wherein the means for transmitting the positioning capability report further comprises means for transmitting the second set of positioning capability parameters.

29. The UE of claim 26, further comprising means for transmitting, to the network entity, an indication to use the set of positioning capability parameters for the RRC state of the UE.

30. The UE of claim 26, wherein the means for performing PRS processing during the RRC unconnected state comprises means for processing the number of PRS resources per slot, the number of PRS symbols per time window, a maximum bandwidth, type-1 or type-2 PRS buffering behavior, or combinations thereof.

31. A non-transitory computer-readable medium storing computer-executable instructions that, when executed by one or more processors of a user equipment (UE), cause the UE to:

determine a first set of positioning capability parameters for a radio resource control (RRC) connected state;

determine a second set of positioning capability parameters for an RRC unconnected state, wherein the RRC unconnected state comprises an RRC inactive state or an RRC idle state, and wherein the first set of positioning capability parameters for the RRC connected state and the second set of positioning capability parameters for the RRC unconnected state differ in a number of positioning reference signal (PRS) symbols per time window and a number of PRS resources per slot that the UE can process;

transmit, to a network entity, a positioning capability report that comprises the first set of positioning capability parameters; and perform PRS processing at least according to one or more positioning capability parameters from a set of positioning capability parameters for an RRC state of the UE, the RRC state of the UE comprising the RRC connected state or the RRC unconnected state.

32. The non-transitory computer-readable medium of claim 31, wherein the first set of positioning capability parameters and the second set of positioning capability parameters further differ in at least one of:

a measurement gap repetition period (MGRP);

a measurement gap length (MGL);

a ratio of MGL to MGRP;

a number of PRS resources per symbol that the UE can process;

a retuning gap;

a channel collision rule that defines a priority of a PRS resource relative to a non-PRS resource; or a processing budget rule.

* * * * *